United States Patent
Foster et al.

(10) Patent No.: US 12,441,491 B2
(45) Date of Patent: Oct. 14, 2025

(54) POWERTRAIN FOR AERIAL VEHICLE

(71) Applicant: Sonin Hybrid, LLC, Atlanta, GA (US)

(72) Inventors: Curtis Asa Foster, Lawrenceville, GA (US); Raymond Samuel Trey Davenport, III, Gillsville, GA (US); Steven Brian Shenker, Cape Town (CA)

(73) Assignee: Sonin Hybrid, LLC, Atlanta, GA (US)

( * ) Notice: Subject to any disclaimer, the term of this patent is extended or adjusted under 35 U.S.C. 154(b) by 669 days.

(21) Appl. No.: 17/232,485

(22) Filed: Apr. 16, 2021

(65) Prior Publication Data
US 2021/0323691 A1 Oct. 21, 2021

Related U.S. Application Data

(60) Provisional application No. 63/011,517, filed on Apr. 17, 2020.

(51) Int. Cl.
*B64D 35/04* (2006.01)
*B64C 39/02* (2023.01)
(Continued)

(52) U.S. Cl.
CPC ............ *B64U 10/13* (2023.01); *B64D 35/04* (2013.01); *B64U 50/19* (2023.01); *B64U 50/11* (2023.01); *B64U 2201/10* (2023.01)

(58) Field of Classification Search
CPC ...... B64D 35/04; B64C 39/024; B64U 50/13; B64U 50/14; B64U 50/19; B64U 2201/10; B64U 2201/20; B64U 10/10
See application file for complete search history.

(56) References Cited

U.S. PATENT DOCUMENTS

| 1,671,865 A | 5/1928 | Karish |
|---|---|---|
| 1,718,201 A | 6/1929 | Brockway |

(Continued)

FOREIGN PATENT DOCUMENTS

| CA | 2799673 A1 | 8/2013 |
|---|---|---|
| CA | 2988962 A1 | 6/2018 |

(Continued)

OTHER PUBLICATIONS

Sonin Hybrid Recruit Drone Files at 140 MPH and Stays Airborne for 3 Hours. By Coolthings.com. Dated Sep. 25, 2020. Available online as of [Apr. 20, 2023]. Retrieved from https://www.coolthings.com/sonin-hybrid-recruit-drone-140-mph-and-stays-airborne-for-3-hour-flight-time/ (Year: 2020).

(Continued)

*Primary Examiner* — Peter M Poon
*Assistant Examiner* — Marisa V Conlon
(74) *Attorney, Agent, or Firm* — Womble Bond Dickinson (US) LLP

(57) ABSTRACT

A powertrain for an aerial vehicle may include a mechanical power source and an electric power generation device mechanically coupled to the mechanical power source. The powertrain further may include an electric motor electrically coupled to the electric power generation device. A first propulsion member may be mechanically coupled to the mechanical power source and configured to provide a first thrust force. The powertrain also may include a second propulsion member mechanically coupled to the electric motor and configured to provide a second thrust force. A vehicle controller may be provided and configured to at least partially control aerial maneuvering of the aerial vehicle, and cause supply of a first portion of the mechanical power to the first propulsion member and a second portion of the mechanical power to the electric power generation device (Continued)

based at least in part on at least one characteristic associated with maneuvering of the aerial vehicle.

16 Claims, 12 Drawing Sheets

(51) Int. Cl.
| | |
|---|---|
| *B64U 10/10* | (2023.01) |
| *B64U 10/13* | (2023.01) |
| *B64U 50/11* | (2023.01) |
| *B64U 50/13* | (2023.01) |
| *B64U 50/14* | (2023.01) |
| *B64U 50/19* | (2023.01) |

(56) References Cited

U.S. PATENT DOCUMENTS

| | | |
|---|---|---|
| 2,512,823 A | 6/1950 | Blundell |
| 2,862,680 A | 12/1958 | Berger |
| 2,864,235 A | 12/1958 | Paris |
| 2,996,139 A | 8/1961 | Patterson |
| 3,318,554 A | 5/1967 | Ward et al. |
| 3,434,280 A | 3/1969 | Burkhart |
| 3,497,031 A | 2/1970 | Kedziora |
| 3,669,216 A | 6/1972 | Spies |
| 3,695,238 A | 10/1972 | Boerma |
| 4,090,583 A | 5/1978 | Leonard |
| 4,411,596 A | 10/1983 | Chilman |
| 4,456,204 A | 6/1984 | Hapke |
| 4,676,458 A | 6/1987 | Cohen |
| 4,742,976 A | 5/1988 | Cohen |
| 4,835,965 A | 6/1989 | Poehlman |
| 4,991,796 A | 2/1991 | Peters |
| 5,123,614 A | 6/1992 | Whitehouse |
| 5,174,719 A | 12/1992 | Walsh |
| 5,214,253 A | 5/1993 | Houston, Jr. |
| 5,373,119 A | 12/1994 | Suzuki |
| 5,484,120 A | 1/1996 | Blakeley |
| 5,545,860 A | 8/1996 | Wilkes |
| 6,331,099 B1 | 12/2001 | Eccles et al. |
| 6,676,379 B2 | 1/2004 | Eccles et al. |
| 6,903,466 B1 | 6/2005 | Mercier et al. |
| 7,545,121 B2 | 6/2009 | Bolduc |
| 7,762,374 B2 | 7/2010 | Turner |
| 7,789,341 B2 | 9/2010 | Arlton et al. |
| D648,808 S | 11/2011 | Seydoux et al. |
| 8,128,019 B2 | 3/2012 | Annati et al. |
| 8,302,902 B2 | 11/2012 | Lynas et al. |
| 8,800,605 B2 | 8/2014 | Barlow et al. |
| 8,855,952 B2 | 10/2014 | Spierling |
| 8,931,729 B2 | 1/2015 | Alzu'bi et al. |
| 8,992,161 B2 | 3/2015 | Hindle et al. |
| 9,217,417 B2 | 12/2015 | Taneja et al. |
| 9,218,316 B2 | 12/2015 | Bernstein et al. |
| 9,221,537 B2 | 12/2015 | Wang et al. |
| D759,764 S | 6/2016 | Lai |
| 9,527,588 B1 | 12/2016 | Rollefstad |
| 9,527,600 B2 | 12/2016 | Russ et al. |
| D784,202 S | 4/2017 | Park |
| 9,677,564 B1 | 6/2017 | Woodworth et al. |
| 9,752,718 B1 | 9/2017 | Wittig |
| 9,764,833 B1* | 9/2017 | Tighe .................. B64D 13/006 |
| D798,961 S | 10/2017 | Li |
| 9,778,660 B2 | 10/2017 | Von Novak |
| 9,783,294 B2 | 10/2017 | Johannesson et al. |
| D803,097 S | 11/2017 | Wang |
| 9,829,886 B2 | 11/2017 | Yang |
| 9,832,910 B2 | 11/2017 | Pal |
| 9,834,305 B2 | 12/2017 | Taylor |
| D808,860 S | 1/2018 | Tian et al. |
| 9,863,276 B2 | 1/2018 | Prokup |
| 9,878,800 B2 | 1/2018 | Russ et al. |
| 9,896,195 B2 | 2/2018 | Ou |
| 9,902,493 B2 | 2/2018 | Simon et al. |
| 9,914,537 B2 | 3/2018 | Wu et al. |
| D814,350 S | 4/2018 | Joo |
| D814,971 S | 4/2018 | Huang |
| 9,944,404 B1 | 4/2018 | Gentry |
| D816,547 S | 5/2018 | Cui |
| 9,970,526 B1 | 5/2018 | Bortoli |
| D820,768 S | 6/2018 | Wang |
| 9,988,159 B2 | 6/2018 | Russ et al. |
| 9,994,305 B1 | 6/2018 | Moldovan |
| 10,046,853 B2 | 8/2018 | Vander Mey |
| D829,283 S | 9/2018 | Cai |
| D830,281 S | 10/2018 | Maqbool |
| 10,093,416 B2 | 10/2018 | Alnafisah |
| 10,093,417 B2 | 10/2018 | Meringer et al. |
| 10,093,430 B2 | 10/2018 | Russ et al. |
| 10,099,783 B1 | 10/2018 | Nilson |
| 10,104,300 B2 | 10/2018 | Guo |
| 10,113,568 B2 | 10/2018 | Bannon |
| D854,967 S | 7/2019 | Yu |
| 10,344,660 B1 | 7/2019 | Harris |
| D862,359 S | 10/2019 | Chen et al. |
| 10,538,316 B2* | 1/2020 | Chen .................. B64U 30/29 |
| D875,602 S | 2/2020 | Xu et al. |
| 10,793,284 B2* | 10/2020 | Prater .................. F16D 25/14 |
| 11,097,839 B2* | 8/2021 | Sinha .................. B60L 53/00 |
| 11,258,333 B2* | 2/2022 | Cottrell .................. H02K 9/06 |
| 11,332,256 B2 | 5/2022 | Hon et al. |
| 11,479,349 B2 | 10/2022 | Kuang et al. |
| 11,482,118 B1 | 10/2022 | Nealy et al. |
| 11,485,488 B1 | 11/2022 | Armer et al. |
| 11,511,854 B2 | 11/2022 | Baity et al. |
| D979,454 S | 2/2023 | Jeong et al. |
| 11,598,960 B1 | 3/2023 | Auerbach |
| 11,603,193 B2 | 3/2023 | Kim et al. |
| 11,661,210 B2 | 5/2023 | D'Arbonneau |
| 11,667,376 B1 | 6/2023 | Auerbach et al. |
| 11,691,721 B1 | 7/2023 | Freiheit |
| 11,708,175 B2 | 7/2023 | Huth et al. |
| 11,719,545 B2 | 8/2023 | Konrardy et al. |
| 11,731,759 B2 | 8/2023 | Ol et al. |
| 11,753,144 B2 | 9/2023 | Tweedt et al. |
| 11,799,162 B2 | 10/2023 | Zagrodnik et al. |
| 11,803,195 B2 | 10/2023 | Auerbach et al. |
| 12,202,633 B2* | 1/2025 | Cai .................. B64U 50/19 |
| 2002/0030494 A1 | 3/2002 | Araki et al. |
| 2002/0163251 A1 | 11/2002 | Crombez et al. |
| 2004/0094662 A1 | 5/2004 | Sanders, Jr. et al. |
| 2004/0200924 A1 | 10/2004 | Clark, Jr. et al. |
| 2004/0255884 A1 | 12/2004 | Arnold |
| 2008/0086247 A1 | 4/2008 | Gu et al. |
| 2010/0032947 A1 | 2/2010 | Bevirt |
| 2010/0283253 A1 | 11/2010 | Bevirt |
| 2010/0308174 A1 | 12/2010 | Calverley |
| 2012/0231696 A1 | 9/2012 | Xu |
| 2012/0298790 A1 | 11/2012 | Bitar |
| 2012/0329593 A1 | 12/2012 | Larrabee et al. |
| 2013/0105620 A1 | 5/2013 | Abde Qader Alzu'bi et al. |
| 2014/0129056 A1 | 5/2014 | Criado |
| 2014/0339371 A1 | 11/2014 | Yates et al. |
| 2015/0097079 A1 | 4/2015 | Frolov et al. |
| 2015/0137523 A1 | 5/2015 | Sia |
| 2015/0232181 A1 | 8/2015 | Oakley et al. |
| 2016/0000003 A1 | 1/2016 | Wendte et al. |
| 2016/0001883 A1 | 1/2016 | Sanz et al. |
| 2016/0023773 A1 | 1/2016 | Himmelmann et al. |
| 2016/0031564 A1 | 2/2016 | Yates |
| 2016/0052626 A1 | 2/2016 | Vander Mey |
| 2016/0214712 A1* | 7/2016 | Fisher .................. B64C 29/02 |
| 2016/0214727 A1 | 7/2016 | Hamel et al. |
| 2016/0221683 A1* | 8/2016 | Roberts .................. B64D 27/02 |
| 2016/0253907 A1 | 9/2016 | Taveira |
| 2016/0325834 A1* | 11/2016 | Foster .................. B64U 50/34 |
| 2017/0072812 A1* | 3/2017 | Von Novak .................. B60L 53/20 |
| 2017/0197700 A1* | 7/2017 | Wainfan .................. B64D 27/24 |
| 2017/0208512 A1 | 7/2017 | Aydin et al. |
| 2017/0225573 A1* | 8/2017 | Waltner .................. B60L 50/16 |
| 2017/0260872 A1 | 9/2017 | Munevar |
| 2017/0297733 A1 | 10/2017 | Zhao |
| 2018/0050811 A1 | 2/2018 | Niergarth |

(56) References Cited

U.S. PATENT DOCUMENTS

| | | |
|---|---|---|
| 2018/0075417 A1 | 3/2018 | Gordon et al. |
| 2018/0118361 A1 | 5/2018 | Choi et al. |
| 2018/0233055 A1 | 8/2018 | Damnjanovic et al. |
| 2019/0100322 A1* | 4/2019 | Schank .................. F02C 6/14 |
| 2019/0118943 A1* | 4/2019 | Machin .................. B64C 11/30 |
| 2019/0256204 A1 | 8/2019 | Sun et al. |
| 2020/0062414 A1 | 2/2020 | Hon |
| 2020/0094694 A1 | 3/2020 | Zhang |
| 2020/0213517 A1 | 7/2020 | Yin et al. |
| 2020/0283141 A1 | 9/2020 | Foster |
| 2021/0094694 A1 | 4/2021 | Seminel |
| 2021/0095636 A1 | 4/2021 | Seminel |
| 2021/0114727 A1 | 4/2021 | Foster |
| 2021/0323691 A1* | 10/2021 | Foster .................. B64U 10/13 |
| 2022/0055736 A1 | 2/2022 | Foster et al. |
| 2022/0055740 A1 | 2/2022 | Foster et al. |
| 2022/0055765 A1 | 2/2022 | Foster et al. |
| 2022/0135241 A1 | 5/2022 | Foster et al. |
| 2022/0157177 A1 | 5/2022 | Eyhorn |
| 2022/0169380 A1 | 6/2022 | Mehrgan |
| 2022/0236745 A1 | 7/2022 | Fagiano |
| 2022/0285753 A1 | 9/2022 | Rainville et al. |
| 2023/0303274 A1 | 9/2023 | Foster et al. |
| 2023/0399115 A1 | 12/2023 | Anderson et al. |

FOREIGN PATENT DOCUMENTS

| | | |
|---|---|---|
| CA | 3132945 A1 | 10/2020 |
| CN | 209195532 U | 8/2019 |
| CN | 212177266 U | 12/2020 |
| CN | 113503201 A | 10/2021 |
| DE | 102018126671 A1 | 4/2020 |
| EM | 008160097-0003 | 3/2021 |
| KR | 20080042267 A | 5/2008 |
| KR | 20080068126 A | 7/2008 |
| WO | WO2017/131451 A1 | 8/2017 |

OTHER PUBLICATIONS

English translation of KR 20080042267 (Year: 2008).

Maltz, William et al., Siemens, Realize Live, The Role of Computational Fluid Dynamics in Drone Design, 2019.

* cited by examiner

POWERTRAIN FOR AERIAL VEHICLE

PRIORITY CLAIM

This U.S. non-provisional patent application claims priority to and the benefit of, under 35 U.S.C. § 119(e), U.S. Provisional Application No. 63/011,517, filed Apr. 17, 2020, the disclosure of which is incorporated herein by reference in its entirety.

TECHNICAL FIELD

The present disclosure relates to aerial vehicles, and more particularly, to powertrains for aerial vehicles. Other aspects also are described.

BACKGROUND

Multirotor aerial vehicles are often powered by electric motors supplied with electrical power stored in batteries, such as lithium polymer batteries. However, multirotor aerial vehicles relying on electric powertrains are largely incapable of carrying heavier payloads and longer flight durations because batteries and electric motors having a sufficient capacity to lift such heavier payloads and achieve longer flight durations often are heavy and complex, and largely offset any gains in power and flight duration as providing more battery capacity and more powerful electric motors typically adds significant weight to the aerial vehicle. Moreover, this problem is compounded by the inherently inefficient mode of flight of multirotor aerial vehicles as compared to fixed-wing aircraft. Furthermore, as the battery and power capacity of the aerial vehicle is increased, the amount of heat generated by the electrical components of the system also increases, and it becomes challenging to provide sufficient cooling for the electrical components. As a result, the utility of electrically-powered multirotor aerial vehicles generally has been limited to carrying relatively light payloads and short duration flights. Accordingly, it can be seen that a need exists for providing power to an aerial vehicle that may address the foregoing and other related, and unrelated, issues and/or problems.

SUMMARY

In view of the foregoing, in one aspect, the present disclosure is directed to a powertrain for aerial vehicles that may provide the ability for an aerial vehicle to carry increased payloads and/or attain flights of longer duration.

In some embodiments, the powertrain may include a mechanical power source configured to supply mechanical power, and an electric power generation device coupled to the mechanical power source and configured to convert at least a portion of the mechanical power into electrical power. The powertrain may also include an electric motor coupled to the electric power generation device and configured to convert electrical power into rotational power.

In addition, the powertrain may further include a first propulsion member mechanically coupled to the mechanical power source and configured to convert mechanical power supplied by the mechanical power source into a first thrust force. The powertrain may also include a second propulsion member mechanically coupled to the electric motor and configured to convert rotational power supplied by the electric motor into a second thrust force.

Still further, in some embodiments, a vehicle controller can be provided in communication with at least one of the mechanical power source, the electric power generation device, or the electric motor. The vehicle controller generally will be configured to at least partially control aerial maneuvering of the aerial vehicle, cause supply of a first portion of the mechanical power from the mechanical power source to the first propulsion member, and cause supply of a second portion of the mechanical power from the mechanical power source to the electric power generation device; for example, based at least in part on at least one characteristic associated with maneuvering of the aerial vehicle.

According to an additional aspect, the present disclosure is also generally directed to an aerial vehicle. The aerial vehicle may include a chassis and a mechanical power source coupled to the chassis and configured to supply mechanical power. The aerial vehicle may also include an electric power generation device coupled to the chassis and the mechanical power source and configured to convert at least a portion of the mechanical power into electrical power. The aerial vehicle may also include an electric motor coupled to the chassis and the electric power generation device and configured to convert electrical power into rotational power.

The aerial vehicle may further include a first propulsion member coupled to the chassis and the mechanical power source and configured to convert at least a portion of the mechanical power supplied by the mechanical power source into a first thrust force. The aerial vehicle may also include a second propulsion member coupled to the chassis and the electric motor and configured to convert the rotational power supplied by the electric motor into a second thrust force.

The aerial vehicle may further include a vehicle controller in communication with at least one of the mechanical power source, the electric power generation device, or the electric motor. The vehicle controller may be configured to at least partially control aerial maneuvering of the aerial vehicle, cause supply of a first portion of the mechanical power from the mechanical power source to the first propulsion member, and cause supply of a second portion of the mechanical power from the mechanical power source to the electric power generation device; for example, based at least in part on at least one characteristic associated with maneuvering of the aerial vehicle.

According to another aspect, the present disclosure is generally directed to a method for controlling operation of an aerial vehicle including a mechanical power source and an electric power generation device for supplying power for the operation of the aerial vehicle. The method may include operating the mechanical power source to generate mechanical power mechanically coupled to a first propulsion member. The method may also include receiving at least one signal indicative of at least one of a characteristic associated with maneuvering of the aerial vehicle or a status factor associated with the aerial vehicle. The method may also include, based at least in part on the at least one signal, directing supply of a first portion of the mechanical power to the first propulsion member and directing supply of a second portion of the mechanical power to the electric power generation device for generating electrical power, and supplying at least a portion of the electrical power to an electric motor coupled to a second propulsion member.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the invention and not in limitation thereof, since the scope of the invention is defined by the claims.

Figure 1A:
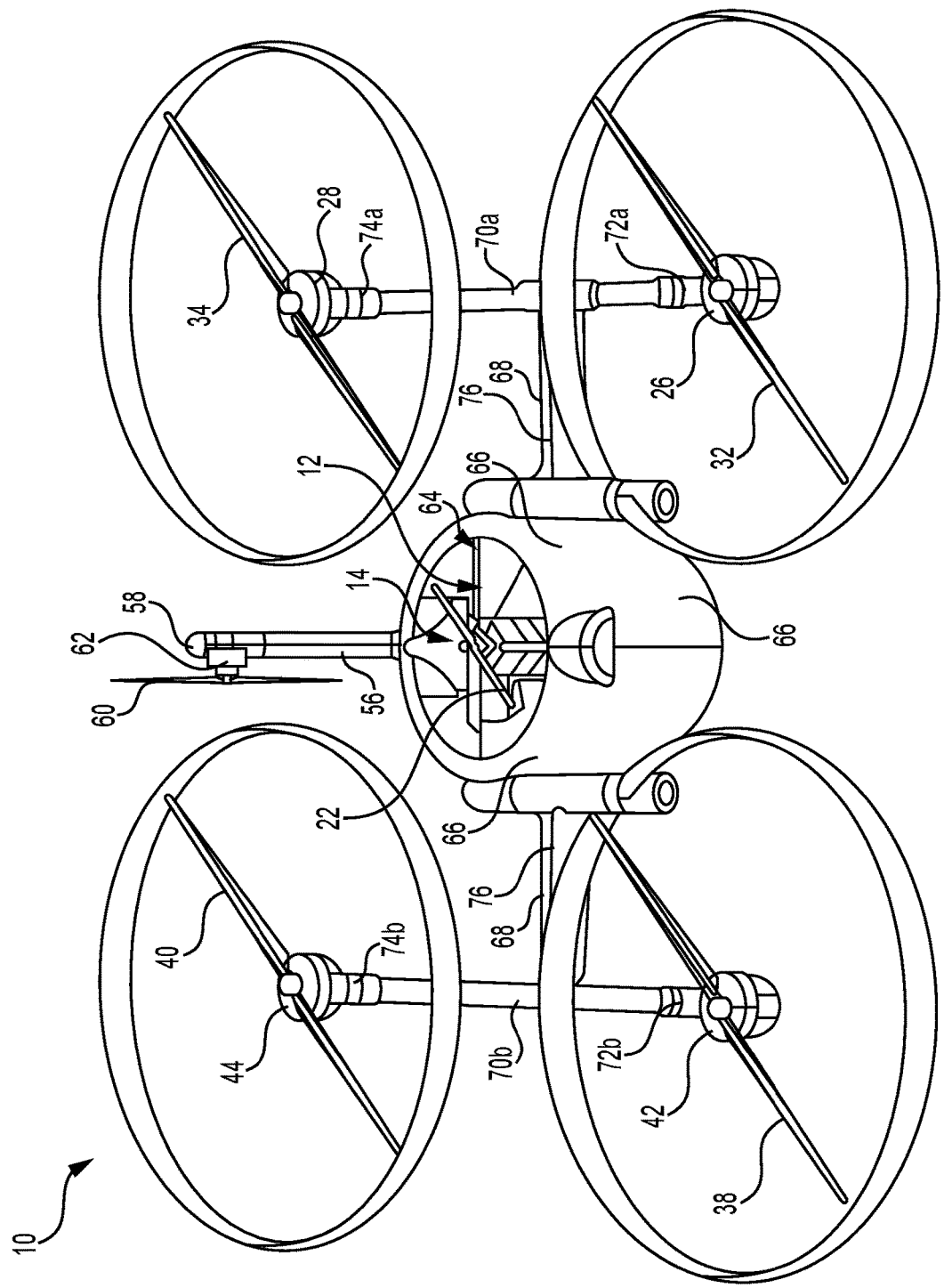
FIG. 1A is a perspective view of an example aerial vehicle according to an aspect of the present disclosure.
Figure 1B:
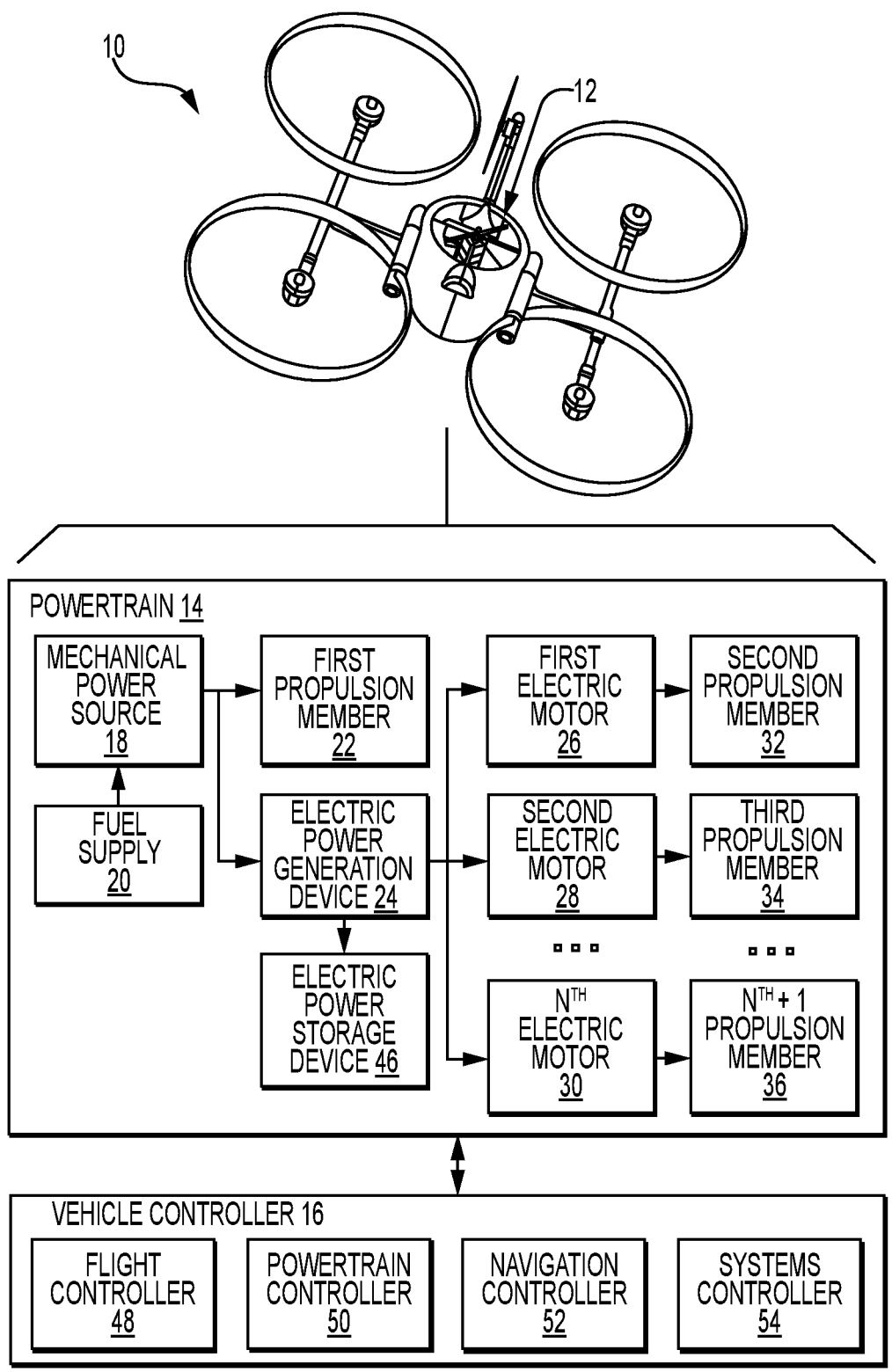
FIG. 1B is a schematic diagram of an example powertrain and an example vehicle controller according to an aspect of the present disclosure

As generally shown in FIGS. 1A and 1B, the present disclosure is directed to an aerial vehicle 10. The example aerial vehicle 10 shown in FIGS. 1A and 1B includes a chassis 12, a powertrain 14 coupled to the chassis 12 and configured to supply power for operation of the aerial vehicle 10, and a vehicle controller 16 configured to control operation of the aerial vehicle 10. As explained in more detail herein, the powertrain 14 and vehicle controller 16 are configured to supply power to the aerial vehicle 10 and control operations associated with the aerial vehicle 10, such as propulsion, maneuvering, and operation of various systems of the aerial vehicle 10.

Although the example aerial vehicle 10 shown in FIGS. 1A and 1B is shown as a multirotor aerial vehicle, the aerial vehicle 10 may be any known type of aerial vehicle. For example, the aerial vehicle 10 may be a fixed-wing aerial vehicle, a duel-rotor aerial vehicle, a vertical take-off and landing vehicle, an aerial vehicle having fixed-wing and multirotor characteristics, a hovercraft, and land-borne vehicle, a water-borne vehicle, etc. The aerial vehicle 10 may be manually controlled via an on-board pilot, and/or can be at least partially remotely controlled, semi-autonomously controlled, and/or autonomously controlled. For example, while the aerial vehicle 10 may be configured to be manually controlled/operated by an on-board pilot, if present, the aerial vehicle 10 generally will be configured to receive control signals from a remote location and be remotely controlled via a remotely located human pilot and/or a remotely located computer-based controller.

In some examples, operations of the aerial vehicle 10 may be controlled entirely by remote control or partially by remote control, i.e. in some embodiments, the aerial vehicle 10 may be configured to be operated remotely during take-off and landing maneuvers, but may be configured to operate semi- or fully-autonomously during maneuvers between take-off and landing. In other embodiments, the aerial vehicle 10 may be an unmanned aerial vehicle that is autonomously controlled, for example, via the vehicle controller 16, which may be configured to autonomously control maneuvering of the aerial vehicle 10 during take-off from a departure location, during maneuvering in-flight between the departure location and a destination location, and during landing at the destination location, for example, without the assistance of a remotely located pilot or remotely located computer-based controller, or an on-board pilot. In some embodiments, the aerial vehicle 10 may be or include a multi-rotor drone, such as drones defined by or similar to Federal Aviation Administration Part 107 or other similar drones.

As shown in FIGS. 1A and 1B, in one embodiment, the example powertrain 14 includes a mechanical power source 16 coupled to the chassis 12 and configured to supply mechanical power to the aerial vehicle 10 for operation. The powertrain 14 shown in FIG. 1B further includes a fuel supply 20, which may include a reservoir for containing fuel and a fuel conduit for providing flow communication between the fuel supply 20 and the mechanical power source 18 for operation of the mechanical power source.

The mechanical power source 18 may be any type of motor, engine, or other driving device that operates by converting energy of the fuel in the fuel supply 20 into a mechanical energy output. For example, the mechanical power source 18 may include any type of internal combustion engine configured to convert any type of fuel into mechanical power, such as a reciprocating-piston engine, a two-stroke engine, a three-stroke engine, a four-stroke engine, a five-stroke engine, a six-stroke engine, a gas turbine engine, a rotary engine, a compression-ignition engine, a spark-ignition engine, a homogeneous-charge compression ignition engine, and/or any other known type of engine. The fuel supply 20 may include any type of fuel that may be converted into mechanical power, such as gasoline, gasohol, ethanol, diesel fuel, bio-diesel fuel, aviation fuel, jet fuel, hydrogen, liquefied-natural gas, propane, nuclear fuel, and/or any other known type of fuel convertible into mechanical power by the mechanical power source 18.

In at least some examples, the mechanical power source 18 and the fuel supply 20 may be selected and/or configured to provide a relatively higher power density as compared a combination of batteries and electric motors. Although only a single mechanical power source 18 is shown in FIG. 1B, the powertrain 14 may include more than one mechanical power source, and the multiple mechanical power sources may be mechanical power sources of the same type or of different types, and/or may be configured to operate using the same type of fuel or different types of fuel.

As shown in FIGS. 1A and 1B, the example powertrain 14 also includes a first propulsion member 22 coupled to the chassis 12 and the mechanical power source 18. The first propulsion member 22 is configured to convert at least a portion of the mechanical power supplied by the mechanical power source 18 into a thrust force. The thrust force may be used to assist the aerial vehicle 10 during take-off, during flight, during maneuvering, and/or during landing. The first propulsion member 22 may include any type of device configured to convert at least a portion of mechanical power supplied by the mechanical power source 18 into a thrust force capable of assisting flight of the aerial vehicle 10. For example, the first propulsion device 22 may include a propeller, an open rotor, and/or a ducted fan mechanically coupled to the mechanical power source 18, for example, via a rotating shaft, and the first propulsion device 22 may be configured to convert power from the rotating shaft into a thrust force.

In the example shown in FIG. 1B, the powertrain 14 also includes an electric power generation device 24 coupled to the chassis 12 and the mechanical power source 18 and configured to convert at least a portion of mechanical power supplied by the mechanical power source 18 into electrical power. For example, the electric power generation device 24 may include a generator mechanically coupled to the mechanical power source 18, for example, via a rotating shaft, and the electrical power generation device 24 may be configured to convert power from the rotating shaft into electrical power for use by other components and devices of the aerial vehicle 10, as explained herein. Although only a single electric power generation device 24 is shown in FIG. 1B, the powertrain 14 may include more than one electric power generation device, and the multiple electric power generation devices may be of the same type or of different types, such as solar-powered and/or wind-powered electric power generation devices.

The example powertrain 14 shown in FIG. 1B also includes one or more electric motors coupled to the chassis 12 and the electric power generation device 24 and configured to convert electrical power into rotational power. The electric power generation device 24 may include one or more electric motors, for example, including a first electric motor 26 and a second electric motor 28 through an $n^{th}$ electric motor 30, with one or more of the first electric motor 26 and the second electric motor 28 through the $n^{th}$ electric motor 30 being coupled to at least one propulsion member. For example, as shown in FIGS. 1A and 1B, the first electric motor 26 may be coupled to a second propulsion member 32 via a drive shaft, the second electric motor 28 may be coupled to a third propulsion device 34 via a drive shaft, and the $n^{th}$ electric motor 30 may be coupled to an $n^{th}+1$ propulsion member 36 via a drive shaft.

In some examples, one or more of the second propulsion member 32 or the third propulsion member 34 through the $n^{th}+1$ propulsion member 36 may be configured to convert at least a portion of the mechanical power supplied by the first electric motor 26 and the second electric motor 28 through the $n^{th}$ electric motor 30 into a respective thrust force. The thrust force may be used to assist the aerial vehicle 10 during take-off, during flight, during maneuvering, and/or during landing. The one or more propulsion members 32, 34, and 36 further may include any type of device configured to convert at least a portion of mechanical power supplied by the respective electric motors into a thrust force capable of assisting flight of the aerial vehicle 10. For example, one or more of the propulsion members 32, 34, and 36 may include a propeller, an open rotor, and/or a ducted fan mechanically coupled to the respective electric motors and configured to generate a thrust force when driven or rotated by their respective electric motors.

The example aerial vehicle 10 shown in FIGS. 1A and 1B includes the first propulsion member 22 coupled to the mechanical power source 18, as well as four propulsion members including the second propulsion member 32, the third propulsion member 34, a fourth propulsion member 38, and a fifth propulsion member 40 coupled respectively to the first electric motor 26, the second electric motor 28, a third electric motor 42, and a fourth electric motor 44. As explained herein, the mechanical power source 18 and the first through fourth electric motors 26, 28, 42, and 44 may be operated in a coordinated manner to cause the aerial vehicle 10 to take-off, maneuver during flight, and land.

As shown in FIG. 1B, the example aerial vehicle 10 also includes the vehicle controller 16, which is in communication with the mechanical power source 18, the electric power generation device 24, and/or one or more of the electric motors 26, 28, 42, or 44. In some embodiments, the vehicle controller 16 may be configured to at least partially control aerial maneuvering of the aerial vehicle 10, such as during selected operations of the aerial vehicle 10, including, but not limited to control of the aerial vehicle 10 or aspects of its operation during take-off, maneuvering during flight, and during landing, by controlling operation of the mechanical power source 18, the electric power generation device 24, and/or one or more of the electric motors 26, 28, 42, or 44.

The vehicle controller 16 may be configured to cause supply of a first portion of the mechanical power from the mechanical power source 18 to the first propulsion member 22 and supply of a second portion of the mechanical power from the mechanical power source 18 to the electric power generation device 24 based at least in part on at least one characteristic associated with maneuvering of the aerial vehicle 10. For example, the vehicle controller 16 may be configured to split mechanical power supplied by the mechanical power source 18 between the first propulsion member 22 and the electric power generation device 24, depending at least in part on the operation of the aerial vehicle 10 at any given moment and/or in an anticipation of future maneuvering.

In some embodiments, such as shown in FIG. 1B, the powertrain 14 may also include an electric power storage device 46 configured to store electric power generated by the electric power generation device 24 for use by any devices of the aerial vehicle 10 that use electric power for operation. The electric power storage device 46 may be any device configured to store electric power, such as one or more batteries of any known type. Electric power stored in the electric power storage device 46 may be used to supply electric power to one of more the electric motors to substitute or supplement electric power supplied by the electric power generation device 24, depending on, for example, the level of charge of the electric power storage device 46 and/or the instantaneous and/or anticipated future electric power requirements of the aerial vehicle 10 for operation and/or maneuvering.

The vehicle controller 16 may also be configured to determine a ratio of the portion of the mechanical power supplied for powering the first propulsion member 22 to the mechanical power supplied to the electric power generation device 24 based at least in part on whether the aerial vehicle 10 lifting off a surface on which the aerial vehicle 10 is supported (e.g., during take-off), hovering while remaining stationary relative to the surface, changing altitude (e.g., ascending or descending), traveling at speed in a given direction, turning, changing pitch, changing roll, and/or changing yaw.

For example, if the aerial vehicle 10 is taking off, a relatively greater portion of the mechanical power supplied by the mechanical power source 18 may be supplied to the first propulsion member 22, as compared to the portion of the mechanical power supplied to the electric power generation device 24. In some circumstances, this may cause the first propulsion member 22 to provide a relatively greater portion of the lift necessary for take-off. If the aerial vehicle 10 has already achieved a desired altitude and is performing a maneuver, such as turning, changing pitch, changing roll, and/or changing yaw, a relatively greater portion of the mechanical power may be supplied to the electric power generation device 24, so that the electric motors and corresponding propulsion members may be used to perform the desired maneuver.

In some aspects, the electric motors may be capable of more quickly responding to control inputs for maneuvering the aerial vehicle 10 due, for example, to an ability of electric motors to more quickly change output speed relative to many types of mechanical power sources, such as some internal combustion engines. Thus, the first propulsion member 22 coupled to the mechanical power source 18 may receive a relatively greater portion of the mechanical power supply during thrust-intensive maneuvers, such as during take-off and while traveling at speed in a given direction. The electric power generation device 24 may also receive a relatively greater portion of the mechanical power supply to supply relatively more electric power to electric motors coupled to the respective propulsion members during maneuvers that are relatively less thrust-intensive, such as during turning, changing pitch, changing roll, and/or changing yaw of the aerial vehicle 10.

As shown in FIG. 1B, the vehicle controller 16 includes a flight controller 48 configured to control maneuvering of the aerial vehicle 10. The vehicle controller 16 may also include a powertrain controller 50 configured to control operation of the mechanical power source 18, the electric power generation device 24, the electric power storage device 46, and/or the flow of power supplied to other powered systems of the aerial vehicle 10, such as the controllers, computing devices, lights, actuators, communications devices, sensors, etc., associated with the aerial vehicle 10. The vehicle controller 16 may also include a navigation controller 52 configured to receive signals indicative of a location, heading, and/or orientation of the aerial vehicle 10 to assist the flight controller 48 with navigating between a flight departure location and a flight destination. As shown in FIG. 1B, some embodiments of the vehicle controller 16 may also include a system controller 54 configured to control operation of various systems of the aerial vehicle 10, such as operation of non-flight related systems, lights, communications devices, payload deposit actuators, etc.

In some operations, the vehicle controller 16 may be configured to control the supply of mechanical power to the first propulsion member 22 and/or the electric power generation device 24 based at least in part on one or more status factors associated with the aerial vehicle 10. The status factors may include, without limitation, an amount of fuel in the fuel supply 20 carried by the aerial vehicle 10, the weight of the aerial vehicle 10, the payload carried by the aerial vehicle 10, the weight distribution of the aerial vehicle 10, a level of charge of the electric power storage device 46 carried by the aerial vehicle 10, a temperature associated with the mechanical power source 10, an altitude of the aerial vehicle 10, and/or the efficiency of any subsystem or overall operation of the aerial vehicle 10.

In the embodiment shown in FIG. 1A, the aerial vehicle 10 includes a longitudinally extending tail section 56 coupled to a rear portion of the chassis 12 and extending rearward relative to the aerial vehicle 10. The remote end 58 of the tail section 56 includes a rotor 60 and a fifth electric motor 62, which may correspond to one of the electric motors of the powertrain 14, as shown in FIG. 1B. The fifth electric motor 62 may be configured to drive the rotor 60 to at least partially control yaw of the aerial vehicle 10. For example, the rotor 60 may be any type of propulsion device configured to convert power supplied by the fifth electric motor 62 into a thrust force. The vehicle controller 16 (e.g., the flight controller 48) further may be configured to at least partially control maneuvering of the aerial vehicle 10 via operation of the rotor 60, for example, to control yaw of the aerial vehicle 10 during maneuvering.

In some examples, one or more of the first propulsion member 22, the second propulsion member 32, the third propulsion member 34, the fourth propulsion member 38, the fifth propulsion member 40, or the rotor 60 may include one or more propellers, and the one or more propellers may be configured to have adjustable pitch. This may enable tailoring of the amount of thrust provided by one or more of the propulsion members independent of, or in combination with, the speed of rotation of the respective propulsion member, which may enhance control and maneuvering of the aerial vehicle 10 and/or the efficiency of operation of the powertrain 14.

As shown in FIG. 1A, the chassis 12 of some examples of the aerial vehicle 10 may include a structural core 64 configured to support the powertrain 14 and provide a support structure to which other portions of the aerial vehicle 10 are attached. For example, the tail section 56 may be coupled to a rear portion of the core 64. As also shown in FIG. 1A, cover portions 66 may be coupled to the core 64 in part to protect components of the aerial vehicle 10, such as the vehicle controller 16 and various components of the powertrain 14, including the electric power generation device 24 and the electric power storage device 46, as well as other components of the aerial vehicle 10 that may be susceptible to damage by environmental elements. The cover portions 66 may at least partially provide aerodynamic characteristics of the aerial vehicle 10, such as reduced aerodynamic drag and/or additional lift during forward flight.

The example aerial vehicle 10 shown in FIG. 1A also includes a pair of lateral supports 68, each coupled to opposite lateral sides of the core 64 of the chassis 12. Respective remote ends of the example lateral supports 68 are each coupled to an intermediate portion of a respective longitudinal rotor beam 70a and 70b configured to support one or more electric motor and propulsion device pairs. For example, as shown in FIG. 1A, a first of one of the lateral rotor beams 70a supports at a forward end 72a, the first electric motor 28 and second propulsion member 32 pair, and at a rearward end 74a, the second electric motor 28 and third propulsion member 34 pair. A second one of the lateral rotor beams 70b supports at a forward end 72b, the third electric motor 42 and fourth propulsion member 38 pair, and at a rearward end 74b, the fourth electric motor 44 and fifth propulsion member 40 pair.

In some embodiments, the lateral supports 68 and the rotor beams 70a and 70b include electric power links to supply electrical power to the first through fourth electric motors 26, 28, 42, and 44 from one or more of the electric power generation device 24, the electric power storage device 46, or the powertrain controller 50. The lateral supports 68 and the rotor beams 70a and 70b may further include communications links configured to transmit/supply control signals for controlled operation of the first through fourth electric motors 26, 28, 42, and 44 from the flight controller 48 and/or the powertrain controller 50, and provide feedback, such as power levels, position data, and other operational information to the vehicle controller 16. The communications links may be hard-wired and/or wireless.

The tail section 56 may also include an electrical power link to supply electric power to the fifth electric motor 62 for operation of the rotor 60 from one or more of the electric power generation device 24, the electric power storage device 46, or the powertrain controller 50. In addition, the tail section 56 may include a communications link to supply control signals for controlled operation of the fifth electric motor 62 coupled to the rotor 60 from the flight controller 48 and/or the powertrain controller 50, and which may receive/transmit feedback, such as power levels, position data, and other operational information to the vehicle controller. The communications link to the fifth electric motor 62 may be hard-wired and/or wireless.

As shown in FIG. 1A, each of the lateral supports 68 may support a respective control surface 76 configured to assist with control of maneuvering of the aerial vehicle 10, for example, during forward flight in a manner at least similar to the control surfaces of a fixed-wing aircraft. The lateral supports 68 may each include (or house) one or more actuators 78 (see, e.g., FIGS. 3 and 6) configured to control orientation of the control surfaces 76, either together or independently of one another. The flight controller 48 may be configured to communicate control signals to one or more of the actuators 78 via hard-wired and/or wireless communication links. In some embodiments, the actuators 78 may be electric actuators (e.g., motors and/or linear actuators) configured to be activated via electrical power supplied by the powertrain 14, for example, by one or more of the electric power generation device 24, the electric power storage device 46, or the powertrain controller 14. Other types of actuators are contemplated, such as hydraulic actuators and/or mechanical actuators.

Figure 2:
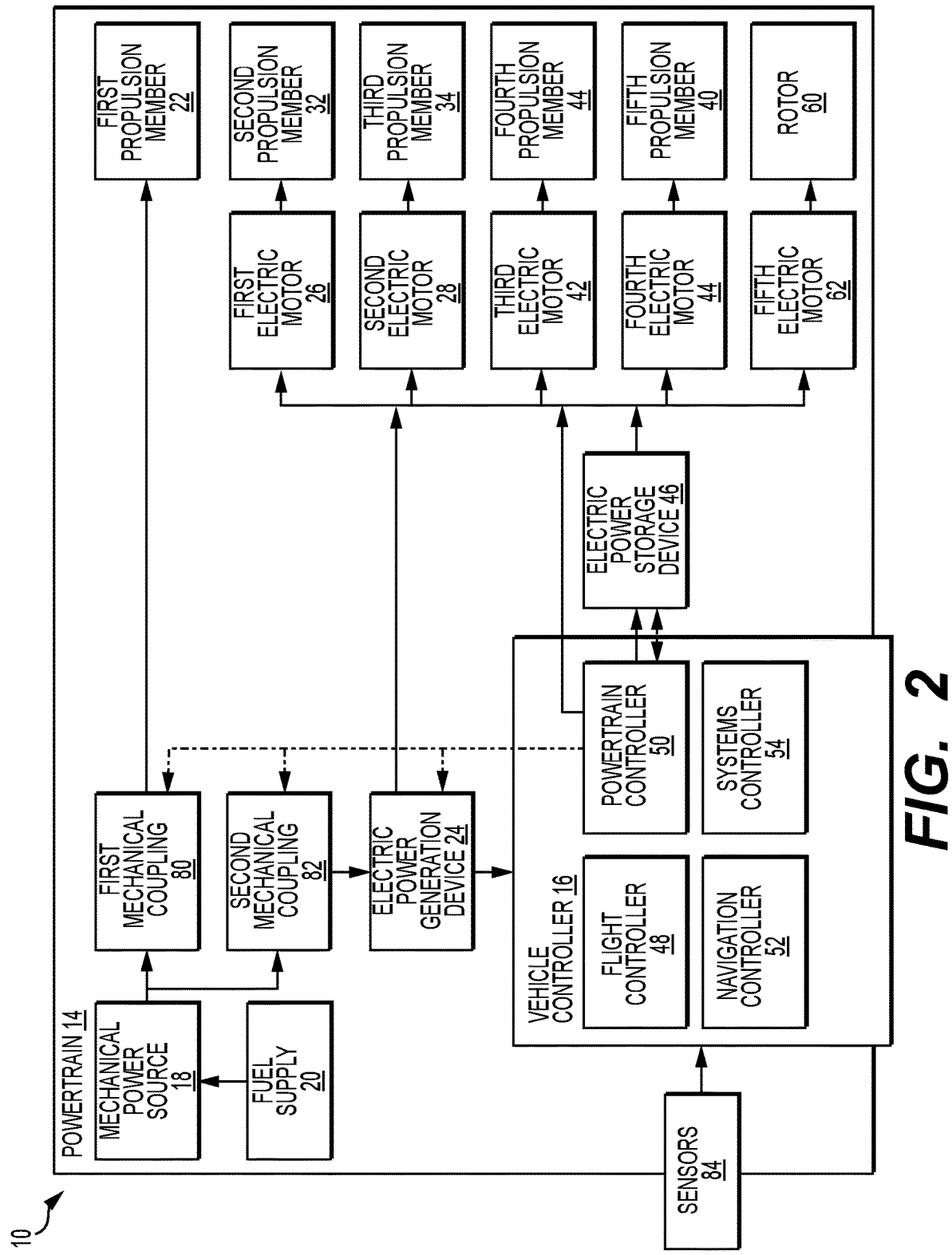
FIG. 2 shows a schematic diagram of a powertrain and a vehicle controller for a vehicle according to another aspect of the present disclosure.

FIG. 2 shows a schematic diagram of an example powertrain 14 and an example vehicle controller 16. As shown in FIG. 2, the example powertrain 14 includes a first mechanical coupling 80 coupling the mechanical power source 18 and the first propulsion member 22 to one another. In addition, the example powertrain 14 also includes a second mechanical coupling 82 coupling the mechanical power source 18 and the electric power generation device 24 to one another.

The first mechanical coupling 80 and/or the second mechanical coupling 82 may generally be configured to facilitate alteration or modification of the mechanical power transferred from the mechanical power source 18 to the first propulsion member 22 and the portion of the mechanical power from the mechanical power source 18 to the electric power generation device 24. For example, the first mechanical coupling 80 and/or the second mechanical coupling 82 may be configured to alter the ratio of the portion of the mechanical power transferred to the first propulsion member 22 to the portion of the mechanical power transferred to the electric power generation device 24. The vehicle controller 16 (e.g., the powertrain controller 50) may also be configured to communicate control signals to the first mechanical coupling 80 and/or the second mechanical coupling 82 to control the ratio based on, for example, one or more characteristics associated with maneuvering of the aerial vehicle 10 and/or one or more status factors associated with the aerial vehicle 10.

In some embodiments, the first mechanical coupling 80 and/or the second mechanical coupling 82 may include a clutch and/or a transmission configured to transfer torque from the mechanical power source 18 to the first propulsion member 22 and/or the electric power generation device 24, respectively. The first mechanical coupling 80 and/or the second mechanical coupling 82 may also include an electrically actuated clutch, a pneumatically actuated clutch, or a hydraulically actuated clutch.

In addition, or alternatively, the first mechanical coupling 80 may include a transmission configured to configured to convert an input speed into an output speed, and control a ratio of the rotational speed of the mechanical power source 18 to the rotational speed of the first propulsion member 22. This may serve to help improve the efficiency, control, and/or operation of the first propulsion member 22 and/or the mechanical power source 18, for example, because the mechanical power source 18 and the first propulsion member 22 may need to be operated at rotational speeds different from one another to achieve the desired flight and maneuvering of the aerial vehicle 10.

The second mechanical coupling 82 may also include a transmission configured to convert an input speed into an output speed, and control a ratio of the rotational speed of the mechanical power source 18 to the rotational speed of the electric power generation device 24. This may serve to help improve the efficiency, control, and/or operation of the electric power generation device 24 and/or the mechanical power source 18, for example, because the mechanical power source 18 and the electric power generation device 24 may need to be operated at rotational speeds different from one another to achieve the desired electric power generation for the powertrain 14 and operation of the aerial vehicle 10. In examples including one or more transmissions, the one or more transmissions may include at least one of a continuously variable transmission, a planetary gear train, or a belt drive.

The mechanical power source 18 may further include a first drive shaft coupling the mechanical power source 18 to the first propulsion member 22, and a second drive shaft coupling the mechanical power source 18 to the electric power generation device 24. The first drive shaft may extend in a first direction relative to the mechanical power source 18, and the second drive shaft extends in a second direction relative to the mechanical power source 18 opposite the first direction. For example, the first drive shaft may extend from a first end of the mechanical power source 18, e.g., upward, and the second drive shaft may extend from a second opposite end of the mechanical power source 18, e.g., downward. The first drive shaft and the second drive shaft may be common or coupled to one another.

In some embodiments, the first drive shaft or the second drive shaft may be hollow, and the other of the first drive shaft or the second drive shaft extends at least partially through the hollow drive shaft. In some such examples, the first propulsion member 22 and the electric power generation device 24 may be on the same end of the mechanical power source 18, for example, such that the electric power generation device 24 is located between the mechanical power source 18 and the first propulsion member 22. In some examples, the powertrain 14 may also include power take-off shaft coupled to the mechanical power source 18 and configured to couple the mechanical power 18 source to one or more of the first propulsion member 22, the second propulsion member 32, or another device or component of the aerial vehicle 10 that is operable via mechanical power supplied by the mechanical power source 18.

As shown in FIG. 2, the aerial vehicle 10 may include one or more sensors 84 configured to generate at least one signal indicative of at least one of a location of the aerial vehicle 10, motion of the aerial vehicle 10 (e.g., heading, speed, and/or orientation of the aerial vehicle 10), at least one object in an environment surrounding the aerial vehicle 10, the weight of the aerial vehicle 10, the weight distribution of the aerial vehicle 10, the weight of a payload carried by the aerial vehicle 10, an amount of fuel in the fuel supply 20 carried by the aerial vehicle 10, or any other condition related to the aerial vehicle 10.

The vehicle controller 16 (e.g., the powertrain controller 50) may be configured to receive one or more signals from the sensors 84 and cause supply of a portion of the mechanical power to the first propulsion member 22 and/or supply of a portion of the mechanical power to the electric power generation device 24 based at least in part on the signals. For example, a ratio of the mechanical power supplied to the first propulsion member 22 to the mechanical power supplied to the electric power generation device 24 may be altered based at least in part on one or more of the signals. In some examples, the vehicle controller 16 (e.g., the flight controller 48) may be configured to receive one or more of the signals and at least partially control aerial maneuvering of the aerial vehicle 10 based at least in part on the one or more signals.

In some examples, the vehicle controller 16 (e.g., the navigation controller 52) may be configured to receive the one or more signals from the sensors 84 and cause the aerial vehicle 10 to take-off, maneuver to a destination, and/or land based at least in part on the one or more signals. For example, the sensors 84 may include a global positioning system (GPS) receiver, accelerometers, gyroscopes, and/or inertial measurement units configured to generate signals received by the navigation controller 52, which may determine the position, velocity, heading, and/or orientation of the aerial vehicle 10, and communicate with the flight controller 48, so that the flight controller 48 can communicate with the powertrain 14 to cause the aerial vehicle 10 to maneuver to the destination.

In some further examples, the sensors 84 may include one or more imagers, one or more light detection and ranging (LIDAR) sensors, one or more radio detection and ranging (RADAR) sensors, and/or one or more sound navigation and ranging (SONAR) sensors, or the like configured to detect objects in the environment surrounding the aerial vehicle 10. The vehicle controller 16 (e.g., the navigation controller 52) may be configured to receive one of more such signals and cause the aerial vehicle 10 to take-off, maneuver to a destination, avoid obstacles, and/or land based at least in part on the one or more signals from the sensors 84.

Figure 3:
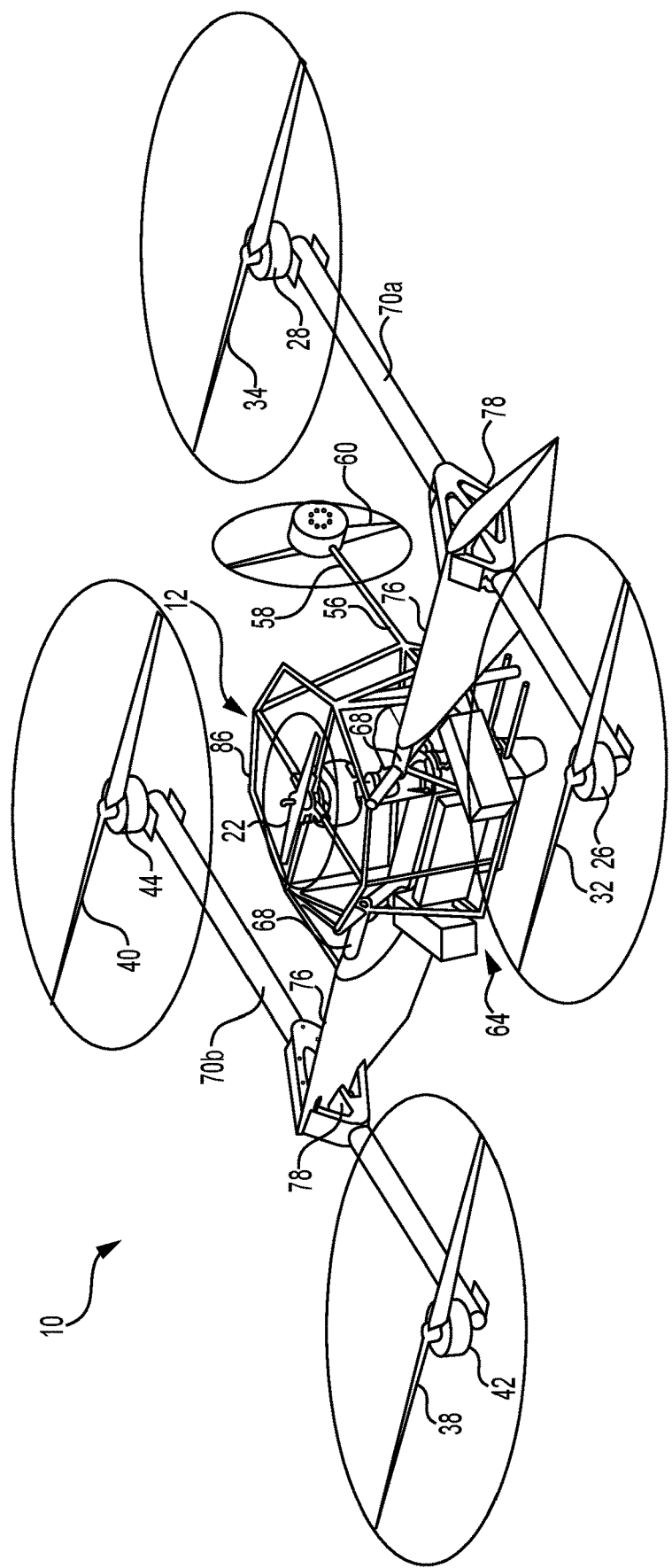
FIG. 3 shows an overhead perspective view of an aerial vehicle with cover portions removed to reveal an example chassis of the aerial vehicle according to a further aspect of the present disclosure.

FIG. 3 shows an overhead perspective view of an example aerial vehicle 10 with the cover portions 66 (see FIG. 1A) removed to reveal an example chassis 12 of the aerial vehicle 10 according to a further aspect of the present disclosure. As shown in FIG. 3, the chassis 12 includes a plurality of frame members 86 forming the core 64 of the chassis 12. In some examples, the chassis 12 may include a monocoque instead of, or in addition to, the frame members 86. In the example shown, the lateral supports 68 are coupled to frame members 86 of the chassis 12 and extend laterally away from the core 64, each supporting a respective control surface 76. The remote ends of the lateral supports 68 are coupled to the respective rotor beams 70a and 70b, and the actuators 78 configured to control operation of the control surfaces 76 are located at the remote ends of the lateral supports 68. In some examples, the actuators 78 may be located at the in-board ends of the lateral supports 68 and/or between the remote ends and the in-board ends of the lateral supports 68.

In some examples, one or more of the propulsion members may be coupled to the aerial vehicle 10, such that the orientation of the one or more propulsion members may be altered with respect to the chassis 12. This configuration may provide greater control of operation of the aerial vehicle 10, for example, by facilitating a change in direction of the thrust force of the respective propulsion member. In such examples, the aerial vehicle 10 may include actuators configured to alter the orientation of the propulsion members, and the vehicle controller 16 (e.g., the powertrain controller 50 and/or the flight controller 52) may be configured to cause these actuators to alter the orientation of the propulsion members to assist with achieving desired maneuvers.

In addition, one or more movable vanes may be associated with one or more of the propulsion members. The one or more movable vanes may be configured to affect the direction of the thrust force associated with operation of the propulsion members. Such examples may provide greater control of operation of the aerial vehicle 10, for example, by facilitating a change in direction of the thrust force of the propulsion member. In such examples, the aerial vehicle 10 may include actuators configured to alter the orientation movable vanes, and the vehicle controller 16 (e.g., the powertrain controller 50 and/or the flight controller 52) may be configured to cause the movable vane actuators to alter the orientation of the movable vanes to assist with achieving desired maneuvers.

Figure 4:
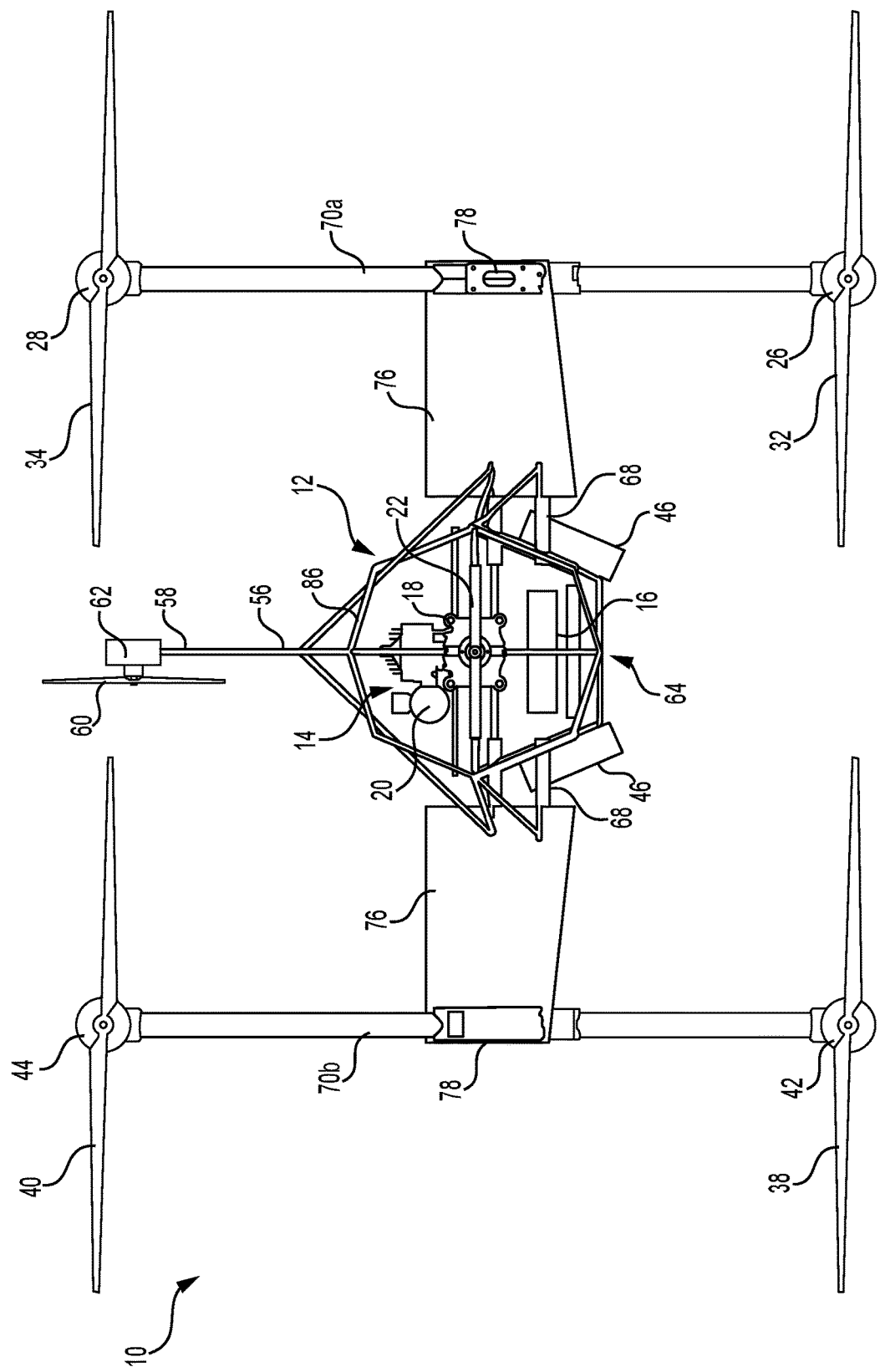
FIG. 4 shows a top view of the aerial vehicle of FIG. 3 with cover portions removed to reveal the chassis and an example arrangement of propulsion members.

FIG. 4 shows a top view of the example aerial vehicle 10 shown in FIG. 3 with the cover portions 66 removed to reveal the example chassis 12 of the aerial vehicle 10. As shown in the top view, for some examples of the aerial vehicle 10, some of the propulsion members are located at corners of a polygon as viewed from above the aerial vehicle 10. For example, as shown in FIG. 4, the second propulsion member 32, the third propulsion member 34, the fourth propulsion member 38, and the fifth propulsion member 40 are located at the corners of a rectangle as viewed from above the aerial vehicle 10. Other numbers of propulsion members and/or forms of polygon are contemplated. For example, the aerial vehicle 10 may include fewer or more than five propulsion members, and the propulsion members may not be arranged in a polygon. For example, some or all of the propulsion members may be arranged along a line (either straight or curved) as viewed from about the aerial vehicle 10, and in some examples, some or all of the propulsion members may be arranged in a cross (e.g., in two intersecting lines) as viewed from above the aerial vehicle 10.

Figure 5:
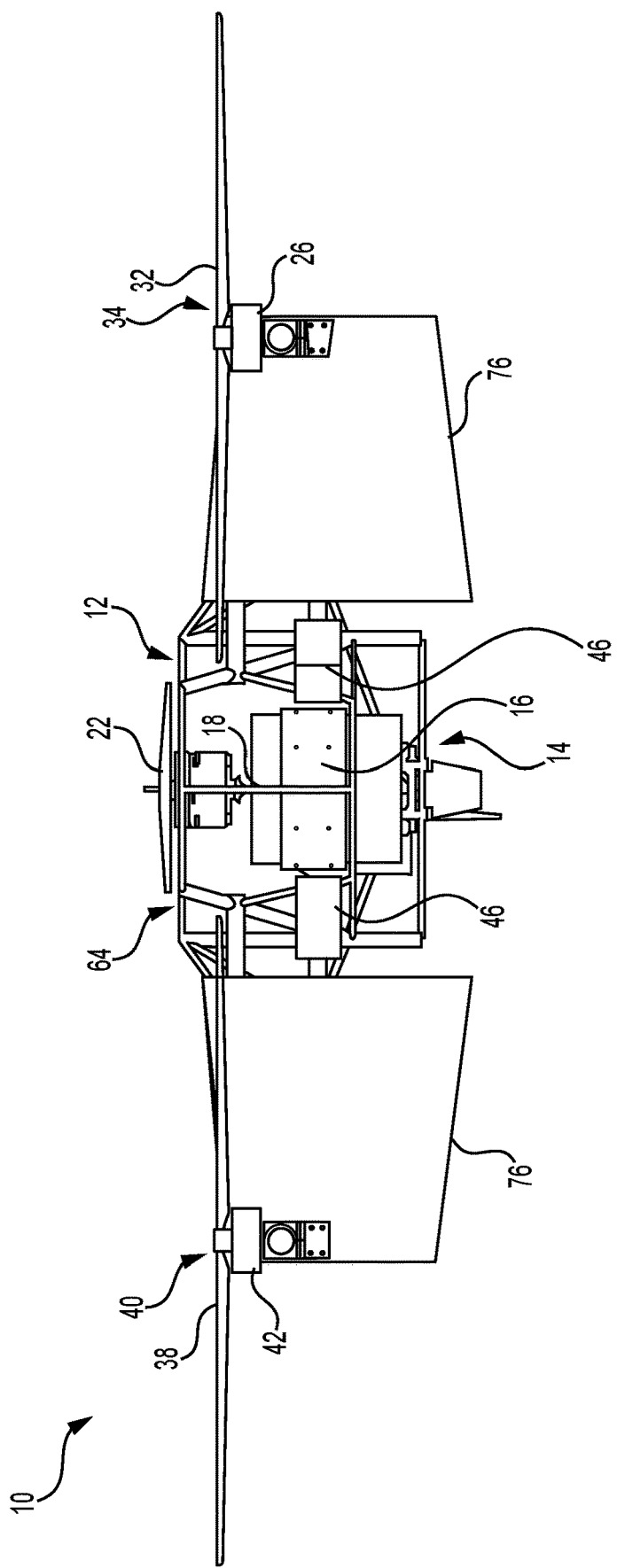
FIG. 5 shows a front view of the example aerial vehicle shown in FIG. 3 with cover portions removed to reveal the example chassis of the aerial vehicle according to a further aspect of the present disclosure.

FIG. 5 shows a front view of the example aerial vehicle 10 shown in FIG. 3 with cover portions 66 (FIG. 1A) removed to reveal the example chassis 12 of the aerial vehicle 10. As shown in FIG. 5, the first propulsion member 22 coupled to the mechanical power source 18 is located at a level higher than the other propulsion members of the aerial vehicle 10 as viewed from the front of the aerial vehicle 10. In addition, in the example shown in FIG. 5, the second propulsion member 32, the third propulsion member 34, the fourth propulsion member 38, and the fifth propulsion member 40 are located at substantially the same level as viewed from the front of the aerial vehicle 10.

Other relationships of the levels of the propulsion members are also contemplated. For example, all the propulsion members may be located at substantially the same level as viewed from the front of the aerial vehicle 10, and in some examples, pairs of the propulsion members may be located at substantially the same level, for example, with different pairs of the propulsion members being located at different levels as viewed from the front of the aerial vehicle 10.

Figure 6:
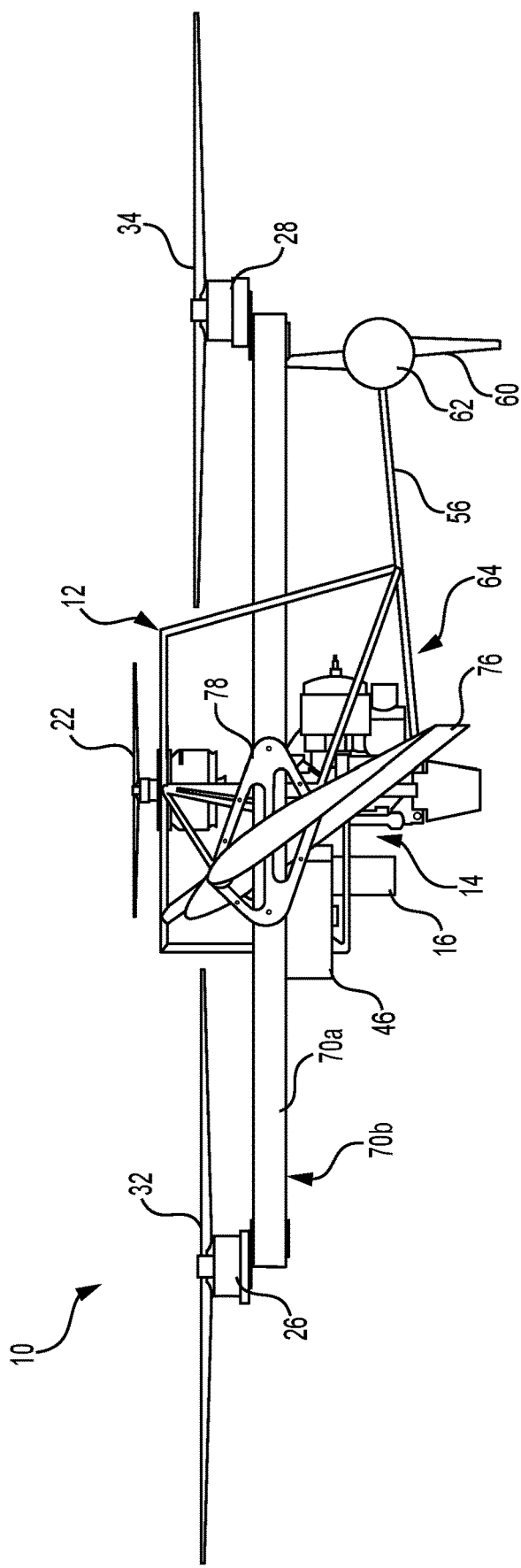
FIG. 6 shows a side view of the example aerial vehicle shown in FIG. 3 with cover portions removed to reveal the example chassis of the aerial vehicle according to another aspect of the present disclosure.

FIG. 6 shows a side view of the example aerial vehicle 10 shown in FIG. 3 with the cover portions 66 (FIG. 1A) removed to reveal the example chassis 12 of the aerial vehicle 10. As shown in FIG. 6, in some examples of the aerial vehicle 10, the rotor 60 is located at a level below the other propulsion members as viewed from the side of the aerial vehicle 10. As shown, the tail section 56 extends from the core 64 of the chassis 12 from a position below the rotor beams 70a and 70b. Other relationships of the levels of the rotor 60 and the propulsion members are contemplated. For example, the rotor 60 may be located at the same level as, or a level higher than, one or more of the propulsion members.

Figure 7:
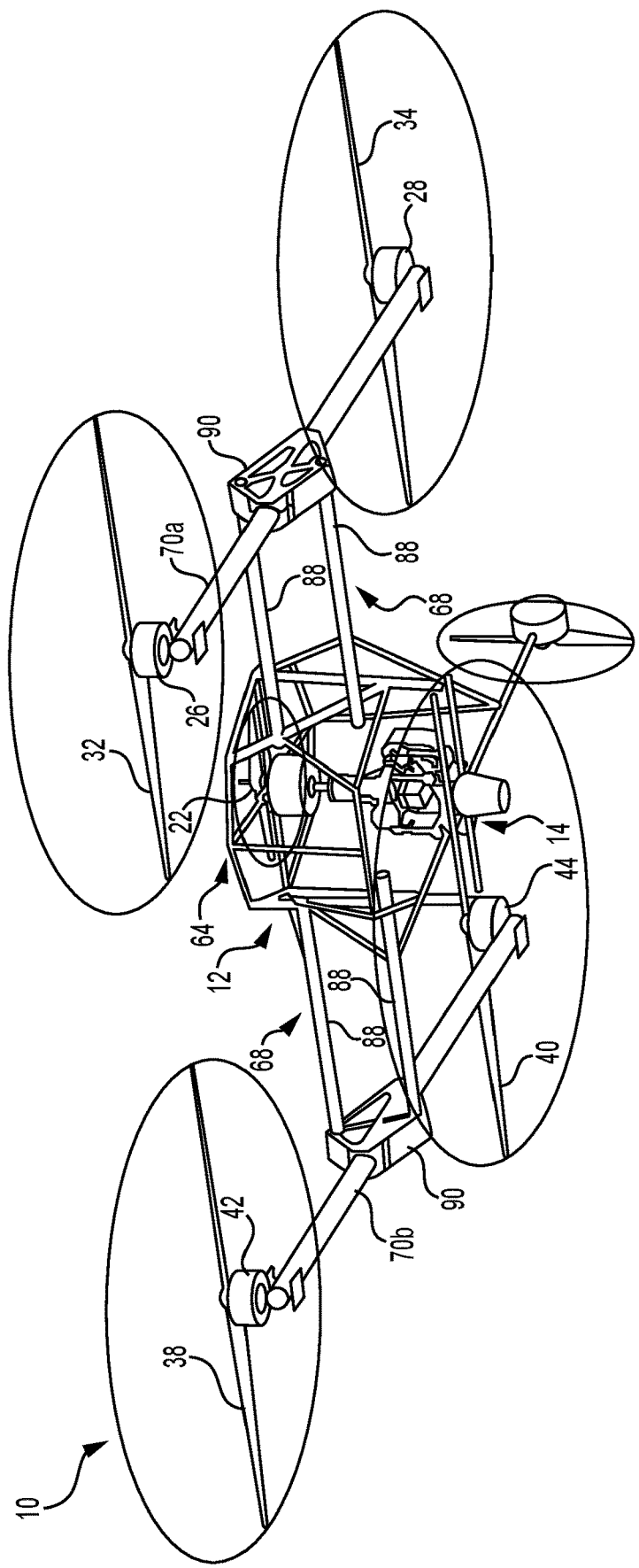
FIG. 7 shows an underside perspective view of the example aerial vehicle shown in FIG. 3 with cover portions removed to reveal the example chassis and powertrain of the aerial vehicle according to a further aspect of the present disclosure.

FIG. 7 shows an underside perspective view of the example aerial vehicle 10 shown in FIG. 3 with the cover portions 66 (FIG. 1A) and the control surfaces 76 (FIG. 3) removed to reveal the example chassis 12, lateral supports 68, and powertrain 14 of the aerial vehicle 10. As shown in FIG. 7, the example lateral supports 68 each include a pair of support beams 88 coupled at an in-board end of the support beams 88 to the core 64 of the chassis 12. Each of the remote ends of the support beams 88 are coupled to the rotor beams 70a and 70b via coupling members 90. Other numbers and/or arrangements of support beams 88 are contemplated.

Figure 8:
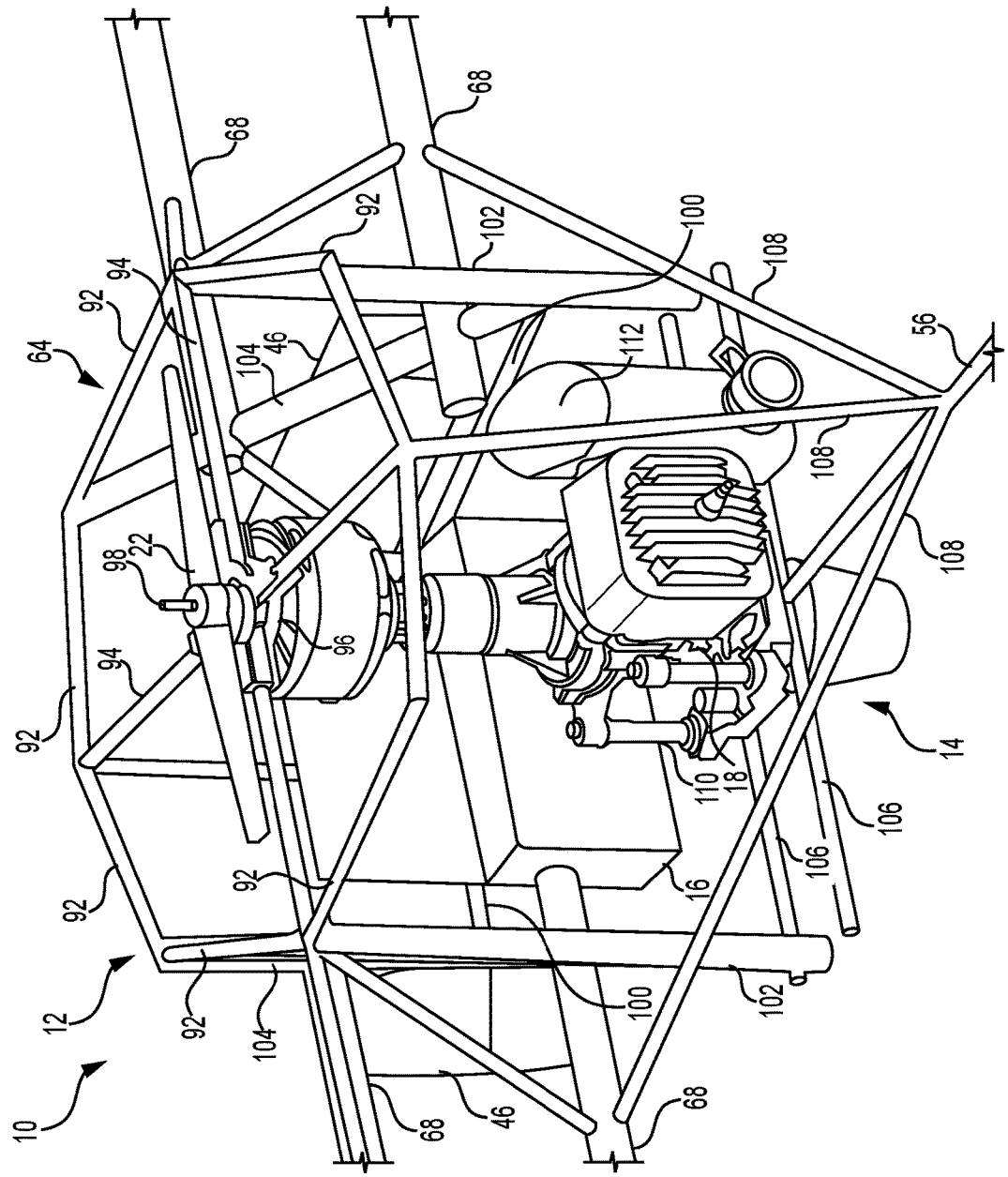
FIG. 8 shows a partial perspective view of an example relationship between the powertrain and the chassis according to an aspect of the present disclosure.

FIG. 8 shows a partial perspective view of the example aerial vehicle 10 shown in FIG. 3 with the cover portions 66 removed to reveal an example relationship between the powertrain 14 and the chassis 12. As shown in FIG. 8, the example powertrain 14 includes the mechanical power source 18 positioned in the core 64 of the chassis 12. The core 64 may include upper frame members 92 forming a polygon and a pair of upper cross members 94 extending inwardly from the upper frame members 92 and providing support for the first propulsion member 22, coupling the first propulsion member 22 to the core 64. In the example shown, the upper cross members 94 support one or more bearings 96, through which a drive shaft 98 of the first propulsion member 22 passes. The core 64 may also include lower frame members 100 and a pair of intermediate frame members 102 extending substantially transverse with respect to the upper frame members 92 and the lower frame members 100. In the example shown, the core 64 also includes a pair of buttresses 104, each coupled to and extending obliquely with respect to the upper frame members 92 and coupled to intermediate frame members 102. Median portions of the buttresses 104 are coupled to in-board ends of the lateral supports 68 and support the lateral supports 68. The example core 64 also includes a pair of powertrain supports 106 extending in a direction substantially parallel to the lateral supports 68 and supporting the powertrain 14.

As shown in FIG. 8, the tail section 56 is coupled to the core 64 at a rearmost one of the powertrain supports 106, and the core 64 includes stabilizers 108 coupling the core 64 and the lateral supports 68 to an intermediate portion of the tail section 56. As shown in FIG. 8, the aerial vehicle 10 also include a powertrain mount 110 coupling the powertrain 14 to the core 64 via the powertrain supports 106. As shown, the core 64 supports the powertrain 14, including two electric power storage devices 46 and the vehicle controller 16. Other arrangements between the chassis 12, the powertrain 14, and the vehicle controller 16 are contemplated.

Figure 9B:
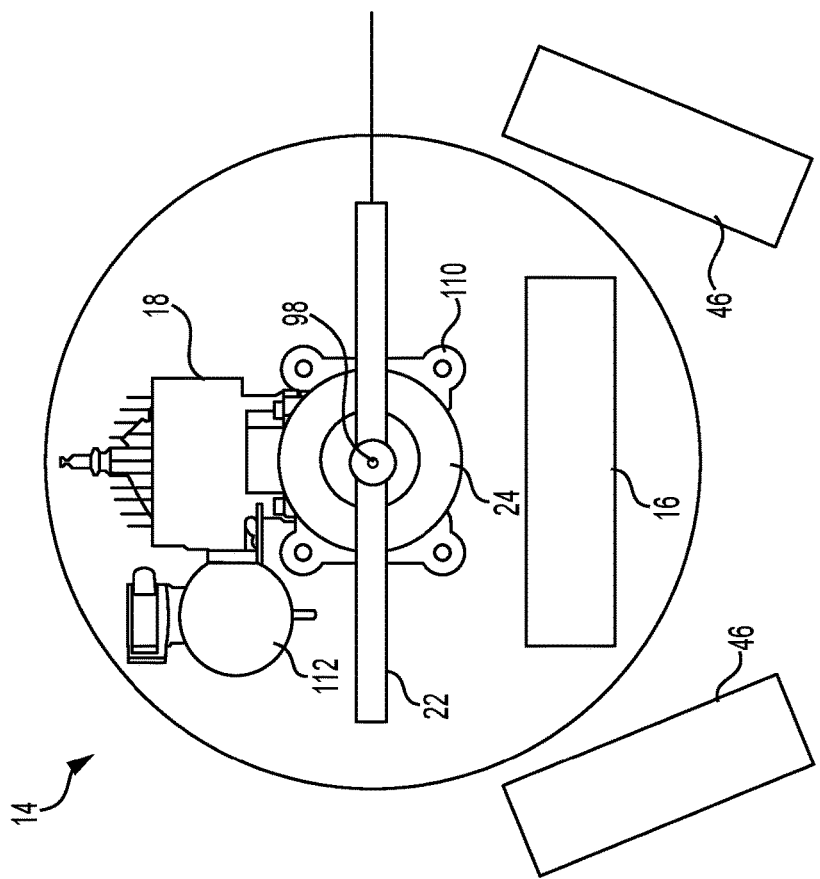
FIG. 9B shows a top view of the example powertrain shown in FIG. 9A.
Figure 9A:
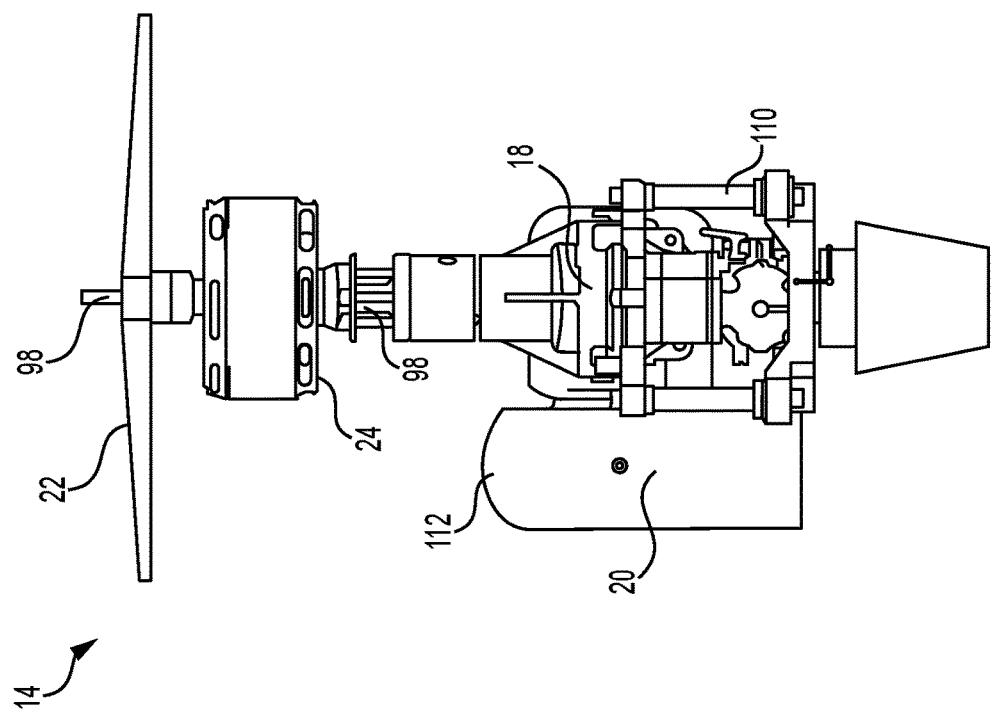
FIG. 9A shows a side view of an example powertrain for an aerial vehicle according to another aspect of the present disclosure.

FIGS. 9A and 9B show a side view and a top view, respectively, of an example powertrain 14 for the aerial vehicle 10. As shown in FIG. 9A, the example powertrain 14 is configured to be mounted such that the drive shaft of the powertrain 14 extends vertically (as shown in FIG. 9A), with the mechanical power source 18 positioned below the electric power generation device 24, and the first propulsion member 22 located above the electric power generation device 24. A fuel tank 112 is located adjacent the mechanical power source 18 and may be supported by the mechanical power source 18 and/or the powertrain mount 110.

In the example shown, a first drive shaft coupling the mechanical power source 18 to the electric power generation device 24 is hollow, and a second drive shaft coupling the mechanical power source 18 to the first propulsion member 22 extends through the first, hollow drive shaft to the first propulsion member 22. This enables the axis of the mechanical power source 18 and the axis of the electric power generation device 24 to be parallel (e.g., collinear), resulting in a compact and vertically aligned assembly. In some such examples, the first propulsion member 22 and the electric power generation device 24 may be on the same end of the mechanical power source 18, for example, such that the electric power generation device 24 is located between the mechanical power source 18 and the first propulsion member 22, as shown in FIG. 9A.

As shown in FIGS. 9A and 9B, according to the example arrangement shown, the thrust force provided by operation of the first propulsion member 22 forces air down over the components of the powertrain 14, thereby providing an inherent cooling effect. As shown in FIG. 9B, the example shown includes two electric power storage devices 46 and the vehicle controller 16 arranged, such that the thrust force produced by operation of the first propulsion member 22 will provide a cooling effect for the electric power storage devices 46 and the vehicle controller 16.

In some embodiments, the cover portions 66 (see FIG. 1A) may additionally include openings to facilitate the flow of the air from the thrust force over one or more of the components of the powertrain 14, thereby enhancing cooling, which may be important for reliable operation of the electric power storage devices 46, the vehicle controller 16, the mechanical power source 18, and/or the electric power generation device 24.

Figure 10:
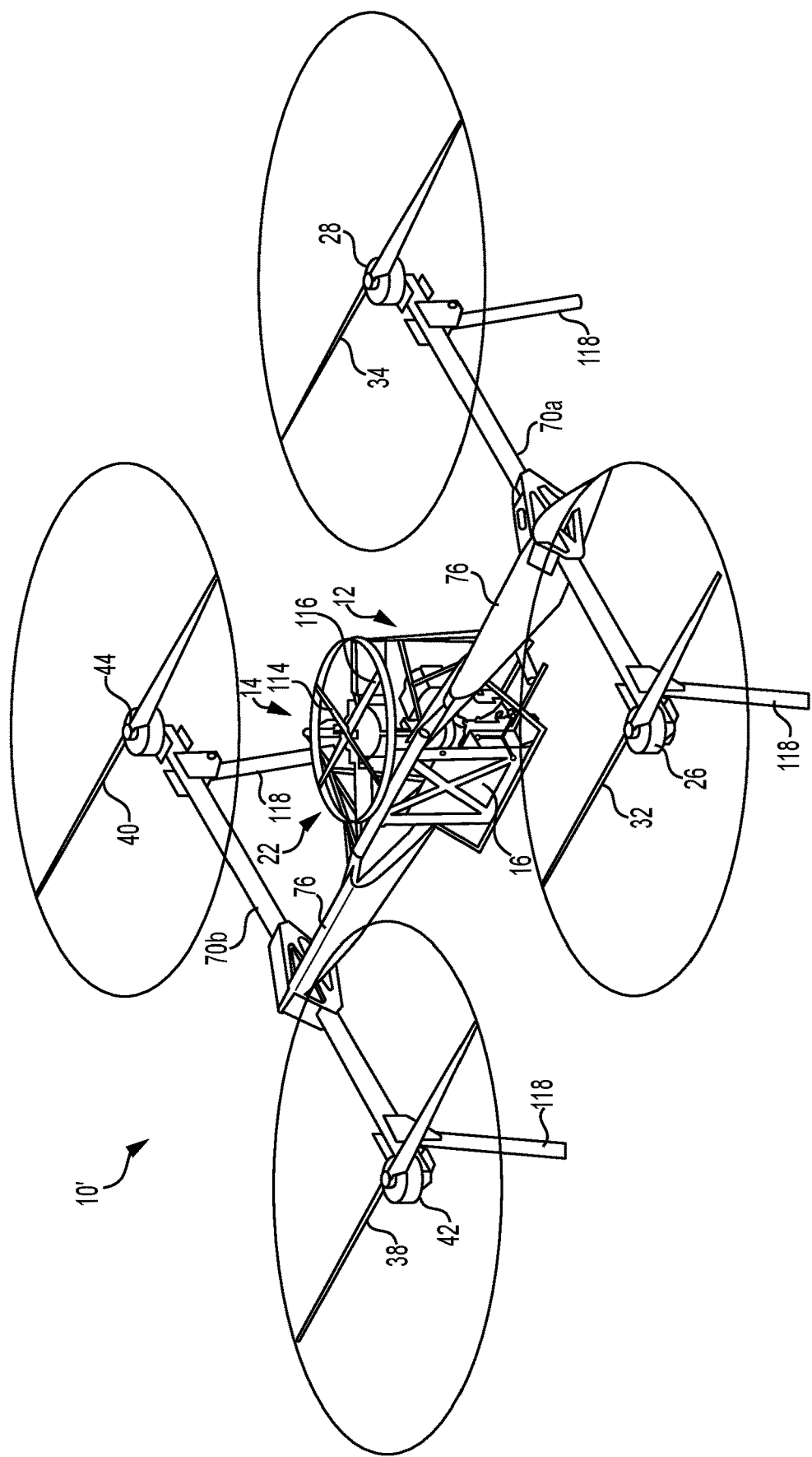
FIG. 10 shows an overhead perspective view of another example aerial vehicle with cover portions removed to reveal an example chassis of the aerial vehicle according to a further aspect of the present disclosure.

FIG. 10 shows an overhead perspective view of another example aerial vehicle 10' with cover portions 66 (FIG. 1A) removed to reveal an example chassis 12 of the aerial vehicle 10'. The example aerial vehicle 10' shown in FIG. 10 does not include a tail section or a rotor, such as shown in the example aerial vehicle 10 of FIGS. 1A, 1B, 3, 4, and 6-8. Rather, in order to at least partially control yaw of the aerial vehicle 10' shown in FIG. 10, the first propulsion member 22 includes a first propeller 114 and a second propeller 116, and the first propeller 114 and the second propeller 116 are counter-rotating propellers having common axes of rotation. In some examples, one or more of the other propulsion members of the aerial vehicle 10' may include first and second propellers that counter-rotate. By controlling the counter-rotation of the first propeller 114 or the second propeller 116, yaw of the aerial vehicle 10' inherent to the direction of rotation of the other of the first propeller 114 or the second propeller 116 may be at least partially counteracted, thus enabling at least partial control of yaw of the aerial vehicle 10'.

In some examples, the vehicle controller 16 (e.g., the flight controller 48 and/or the powertrain controller 50) may be configured to control the counter-rotating propeller. In addition, one or more of the propulsion members other than the first propulsion member 22 (and/or other propulsion members coupled to a mechanical power source) may be controlled to rotate directions opposite from one another. The aerial vehicle 10' further may include a rotor and one or more counter-rotating propellers and/or counter-rotating propulsion members.

In addition, the example aerial vehicle 10' shown in FIG. 10 includes support legs 118 for supporting the aerial vehicle 10' while on the ground. Although the example shown in FIG. 10 includes four support legs 118, fewer or more support legs are contemplated. Although the example aerial vehicle 10' shown in FIG. 10 does not include a tail section 56 or a rotor 60, the example aerial vehicle 10' shown in FIG. 10 may include features consistent with any or all the features described in relation to the example aerial vehicles 10 shown in FIGS. 1A-9.

Figure 11:
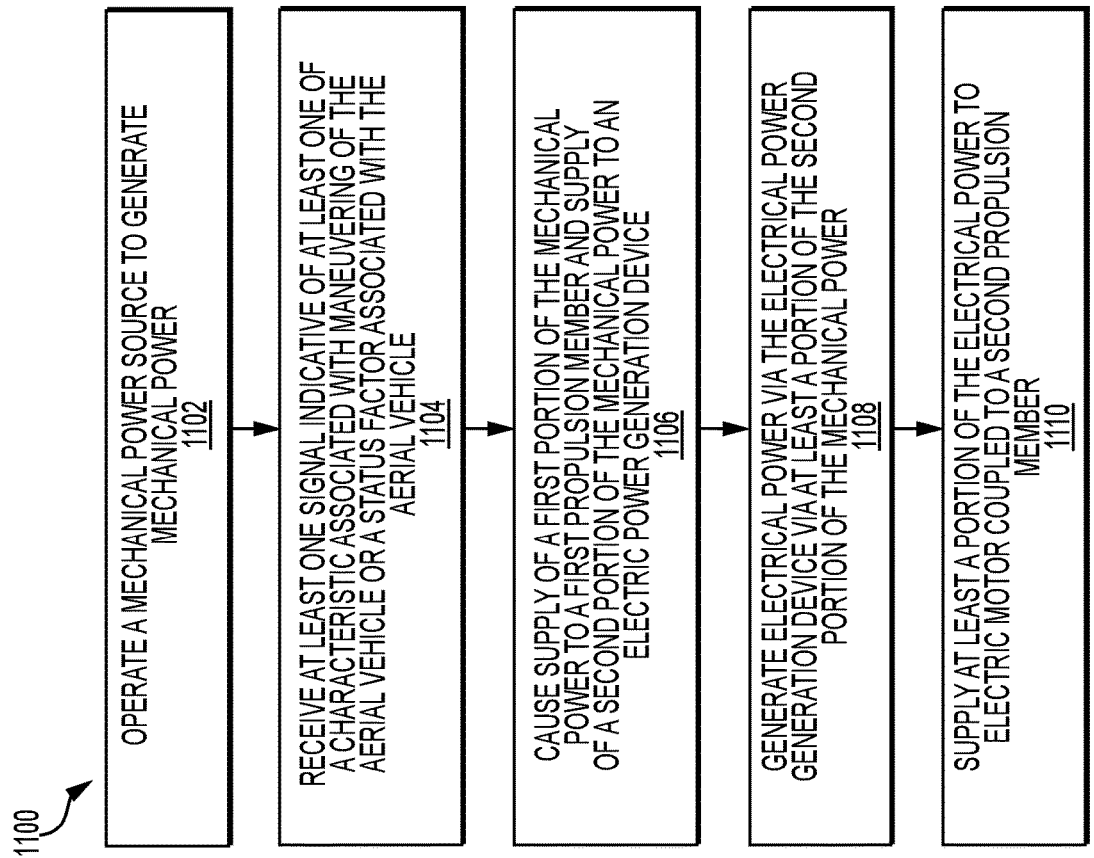
FIG. 11 is a block diagram of an example method for controlling a powertrain of an aerial vehicle.

FIG. 11 is a block diagram of an example method for controlling a powertrain of an aerial vehicle illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 11 is a flow diagram of an example method 1100 for controlling a powertrain of an aerial vehicle. At 1102, the example method 1100 may include operating a mechanical power source to generate mechanical power. For example, an internal combustion engine may be operated to rotate an output shaft to generate mechanical torque and/or power.

At 1104, the example method 1100 may also include receiving at least one signal indicative of at least one of a characteristic associated with maneuvering of the aerial vehicle or a status factor associated with the aerial vehicle. For example, one or more sensors associated with the aerial vehicle may generate at least one signal indicative of characteristics associated with maneuvering of the aerial vehicle and/or status factors associated with the aerial vehicle.

A vehicle controller may receive the at least one signal. The at least one signal indicative of a characteristic associated with maneuvering of the aerial vehicle may include at least one signal indicative of, for example, lifting off a surface on which the aerial vehicle is supported (e.g., during take-off), hovering while remaining stationary relative to the surface, changing altitude (e.g., ascending or descending), traveling at speed in a given direction, turning, changing pitch, changing roll, and/or changing yaw. The at least one signal indicative of a status factor associated with the aerial vehicle may include at least one signal indicative of, for example, the amount of fuel carried by the aerial vehicle, the weight of the aerial vehicle, the payload carried by the aerial vehicle, the weight distribution of the aerial vehicle, a level of charge of one or more electric power storage devices carried by the aerial vehicle, a temperature associated with the mechanical power source, an altitude of the aerial vehicle, and/or the efficiency of any subsystem or overall operation of the aerial vehicle.

The example method 1100, at 1106, may also include, based at least in part on the at least one signal, causing supply of a first portion of the mechanical power to a first propulsion member and causing supply of a second portion of the mechanical power to an electric power generation device. In some examples, the first portion of the mechanical power and the second portion of the mechanical power differ from one another. For example, the mechanical power source may generate mechanical power, the vehicle controller may receive the at least one signal indicative of a characteristic associated with maneuvering of the aerial vehicle and/or indicative of a status factor associated with the aerial vehicle, and based at least in part on the at least one signal, allocate portions of the mechanical power to a first propulsion member mechanically coupled to mechanical power source and to an electric power generation device, thereby splitting the mechanical power. Based at least partially on the at least one signal, the vehicle controller may change a ratio of the first portion to the second portion to account for changes in power requirements for the first propulsion member and the electric power generation device, thereby tailoring the use of power supplied by the mechanical power source to operation of the aerial vehicle.

For example, this may include increasing the first portion of the mechanical power supplied to the first propulsion member during lifting-off of the surface on which the aerial vehicle is supported, increasing altitude of the aerial vehicle, and/or level flight in a given direction. It may be advantageous during such maneuvers to increase the mechanical power supplied to the first propulsion member relative to the mechanical power supplied to the electric power generation device.

In another example, this may include increasing the second portion of the mechanical power supplied to the electric power generation device during at least one of turning the aerial vehicle and increasing altitude of the aerial vehicle. It may be advantageous during such maneuvers to increase the electric power supplied to the electric motors during such maneuvers.

In an additional example, this may include decreasing the first portion of the mechanical power supplied to the first propulsion member during descending of the aerial vehicle. In a further example, this may include decreasing the second portion of the mechanical power supplied to the electric power generation device during descending of the aerial vehicle and/or hovering. In some examples, this may include dynamically changing the first portion of the mechanical power and/or the second portion of the mechanical power during operation of the mechanical power source. In some examples, the method may also include storing at least a portion of the electrical power via one or more electric power storage devices.

The example method 1100, at 1108, may further include generating electrical power via the electrical power generation device via at least a portion of the second portion of the mechanical power. For example, the electrical power generation device may convert at least a portion of the mechanical power supplied by the mechanical power source into electrical power.

At 1110, the example method 1100 may further include supplying at least a portion of the electrical power to an electric motor coupled to a second propulsion member. For example, the electric motor may use the electrical power to drive a second propulsion member of the aerial vehicle. In some examples, portions of the electrical power may be supplied to additional electric motors, which may use the electrical power to drive additional respective propulsion members.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Example Clauses

An example powertrain for an aerial vehicle may include a mechanical power source configured to supply mechanical power; an electric power generation device mechanically coupled to the mechanical power source and configured to convert at least a portion of the mechanical power into electrical power; an electric motor electrically coupled to the electric power generation device and configured to convert electrical power into rotational power; a first propulsion member mechanically coupled to the mechanical power source and configured to convert mechanical power supplied by the mechanical power source into a first thrust force; a second propulsion member mechanically coupled to the electric motor and configured to convert rotational power supplied by the electric motor into a second thrust force; and a vehicle controller in communication with at least one of the mechanical power source, the electric power generation device, or the electric motor.

The vehicle controller may be configured to at least partially control aerial maneuvering of the aerial vehicle; and cause supply of a first portion of the mechanical power from the mechanical power source to the first propulsion member and cause supply of a second portion of the mechanical power from the mechanical power source to the electric power generation device based at least in part on at least one characteristic associated with maneuvering of the aerial vehicle.

The example powertrain above, further including an electric power storage device coupled to the electric power generation device and configured to store at least a portion of electrical power generated by the electric power generation device.

Any one of the example powertrains above, wherein the mechanical power source includes an internal combustion engine.

Any one of the example powertrains above, wherein at least one of the first propulsion member or the second propulsion member includes a propeller.

Any one of the example powertrains above, wherein at least one of the first propulsion member or the second propulsion member includes a first propeller and a second propeller, and wherein the first propeller and the second propeller are counter-rotating propellers having common axes of rotation.

Any one of the example powertrains above, wherein at least one of the first propulsion member or the second propulsion member includes at least one of a propeller, an open rotor, or a ducted fan.

Any one of the example powertrains above, further including a mechanical coupling for coupling the mechanical power source and the first propulsion member to one another, the mechanical coupling configured to facilitate change of the first portion of the mechanical power transferred to the first propulsion member from the mechanical power source.

Any one of the example powertrains above, wherein the mechanical coupling includes at least one of a clutch or a transmission.

Any one of the example powertrains above, wherein the mechanical coupling includes a transmission, and the transmission comprises at least one of a continuously variable transmission, a planetary gear train, or a belt drive.

Any one of the example powertrains above, further including a transmission between the mechanical power source and the first propulsion member and configured to convert an input speed into an output speed, such that an operation speed of the mechanical power source differs from a rotational speed of the first propulsion member.

Any one of the powertrains above, further including a transmission between the mechanical power source and the electric power generation device and configured to convert an input speed into an output speed, such that an operation speed of the mechanical power source differs from a rotational speed of the electric power generation device.

Any one of the example powertrains above, further including a first drive shaft coupling the mechanical power source to the first propulsion member, and a second drive shaft coupling the mechanical power source to the electric power generation device.

Any one of the example powertrains above, wherein the first drive shaft extends in a first direction relative to the mechanical power source, and the second drive shaft extends in a second direction relative to the mechanical power source opposite the first direction.

Any one of the example powertrains above, wherein one of the first drive shaft or the second drive shaft is hollow, and the other of the first drive shaft or the second drive shaft extends at least partially through the one of the first drive shaft or the second drive shaft.

Any one of the example powertrains above, further including a power take-off shaft coupled to the mechanical power source and configured to couple the mechanical power source to at least one device configured to use at least a portion of the mechanical power.

Any one of the example powertrains above, wherein operation of the first propulsion member is configured to cause at least one of vehicle thrust, vehicle lift, or control of vehicle maneuvering for the aerial vehicle.

Any one of the example powertrains above, wherein operation of the second propulsion member is configured to cause at least one of vehicle thrust, vehicle lift, or control of vehicle maneuvering for the aerial vehicle.

Any one of the example powertrains above, further including at least one additional electric motor and at least one additional propulsion member coupled to the at least one additional electric motor.

Any one of the example powertrains above, further including at least one additional propulsion member mechanically coupled to the mechanical power source.

Any one of the example powertrains above, wherein at least one of the first propulsion member or the second propulsion member includes at least one blade configured to change blade pitch.

Any one of the example powertrains above, wherein at least one of the first propulsion member, the vehicle controller, or an electric power storage device is mounted, such that the first propulsion member provides cooling for at least one of the vehicle controller or the electric power storage device.

Any one of the example powertrains above, wherein the at least one characteristic associated with maneuvering of the aerial vehicle includes at least one of: lifting off a surface on which the aerial vehicle is supported, hovering while remaining stationary relative to the surface, changing altitude, traveling at speed in a given direction, turning, changing pitch, changing roll, or changing yaw.

Any one of the example powertrains above, wherein the vehicle controller is configured to cause supply of the first portion of the mechanical power to the first propulsion member and the second portion of the mechanical power to the electric power generation device based at least in part on at least one status factor associated with the aerial vehicle, and the at least one status factor includes at least one of: an amount of fuel carried by the aerial vehicle, a weight of the aerial vehicle, a payload carried by the aerial vehicle, weight distribution of the aerial vehicle, a level of charge of an electric power storage device carried by the aerial vehicle, a temperature associated with the mechanical power source, an altitude of the aerial vehicle, or efficiency of operation of the aerial vehicle.

An example aerial vehicle including: a chassis; a mechanical power source coupled to the chassis and configured to supply mechanical power; an electric power generation device coupled to the chassis and the mechanical power source and configured to convert at least a portion of the mechanical power into electrical power; an electric motor coupled to the chassis and the electric power generation device and configured to convert electrical power into rotational power; a first propulsion member coupled to the chassis and the mechanical power source and configured to convert at least a portion of the mechanical power supplied by the mechanical power source into a first thrust force; a second propulsion member coupled to the chassis and the electric motor and configured to convert the rotational power supplied by the electric motor into a second thrust force; and a vehicle controller in communication with at least one of the mechanical power source, the electric power generation device, or the electric motor.

The vehicle controller may be configured to: at least partially control aerial maneuvering of the aerial vehicle; and cause supply of a first portion of the mechanical power from the mechanical power source to the first propulsion member and cause supply of a second portion of the mechanical power from the mechanical power source to the electric power generation device based at least in part on at least one characteristic associated with maneuvering of the aerial vehicle.

The example aerial vehicle above, wherein the aerial vehicle is configured to be at least one of at least partially remotely controlled, semi-autonomously controlled, or autonomously controlled.

Any one of the example aerial vehicles above, wherein the chassis includes at least one of a plurality of frame members or at least one monocoque member.

Any one of the example aerial vehicles above, wherein the electric motor is a first electric motor, and the aerial vehicle comprises at least one additional electric motor coupled to the chassis and at least one additional propulsion member coupled to the at least one additional electric motor.

Any one of the example aerial vehicles above, wherein the second propulsion member coupled to the first electric motor and the at least one additional propulsion member coupled to the at least one additional electric motor are arranged, such that the second propulsion member and the at least one additional propulsion member are located at corners of a polygon as viewed from above the aerial vehicle.

Any one of the example aerial vehicles above, further including at least one additional propulsion member mechanically coupled to the mechanical power source.

Any one of the example aerial vehicles above, further including at least one additional mechanical power source and at least one additional propulsion member coupled to the at least one additional mechanical power source.

Any one of the example aerial vehicles above, further including an additional propulsion member coupled to the chassis, such that operation of the additional propulsion member facilitates at least partial control of yaw of the aerial vehicle.

Any one of the example aerial vehicles above, further including an additional electric motor coupled to the chassis and the additional propulsion member.

Any one of the example aerial vehicles above, wherein at least one of the first propulsion member or the second propulsion member includes a first propeller and a second propeller, and wherein the first propeller and the second propeller are counter-rotating propellers having common axes of rotation.

Any one of the example aerial vehicles above, further including at least one control surface coupled to the chassis and configured affect maneuvering of the vehicle during flight.

Any one of the example aerial vehicles above, further including at least one movable vane associated with at least one of the first propulsion member or the second propulsion member and configured to affect a direction of thrust associated with operation of the at least one of the first propulsion member or the second propulsion member.

Any one of the example aerial vehicles above, further comprising a pivotable mount coupling at least one of the first propulsion member or the second propulsion member to the chassis and configured to alter orientation of the at least one of the first propulsion member or the second propulsion member relative to the chassis.

Any one of the example aerial vehicles above, further including at least one sensor configured to generate at least one signal indicative of at least one of a location of the aerial vehicle, motion of the aerial vehicle, orientation of the aerial vehicle, at least one object in an environment surrounding the aerial vehicle, a weight of the aerial vehicle, a weight distribution of the aerial vehicle, a weight of a payload carried by the aerial vehicle, or an amount of fuel carried by the aerial vehicle.

Any one of the example aerial vehicles above, wherein the vehicle controller is configured to receive the at least one signal and cause supply of the first portion of the mechanical power to the first propulsion member and cause supply of the second portion of the mechanical power to the electric power generation device based at least in part on the at least one signal.

Any one of the example aerial vehicles above, wherein the vehicle controller is configured to receive the at least one signal and at least partially control aerial maneuvering of the aerial vehicle based at least in part on the at least one signal.

Any one of the example aerial vehicles above, wherein the vehicle controller includes a navigation controller configured to receive the at least one signal, and cause the aerial vehicle to maneuver to a destination based at least in part on the at least one signal.

An example method for controlling a powertrain including a mechanical power source mechanically coupled to a first propulsion member and an electric power generation device of an aerial vehicle may include: operating the mechanical power source to generate mechanical power; receiving at least one signal indicative of at least one of a characteristic associated with maneuvering of the aerial vehicle or a status factor associated with the aerial vehicle; based at least in part on the at least one signal, causing supply of a first portion of the mechanical power to the first propulsion member and causing supply of a second portion of the mechanical power to the electric power generation device; generating electrical power via the electrical power generation device via at least a portion of the second portion of the mechanical power; and supplying at least a portion of the electrical power to an electric motor coupled to a second propulsion member.

The example method above, wherein the first portion of the mechanical power and the second portion of the mechanical power differ from one another.

Any one of the example methods above, further including dynamically changing at least one of the first portion of the mechanical power or the second portion of the mechanical power during operation of the mechanical power source.

Any one of the example methods above, wherein receiving the at least one signal includes receiving at least one signal indicative of at least one characteristic associated with maneuvering of the aerial vehicle, wherein the at least one characteristic associated with maneuvering of the aerial vehicle includes at least one of: lifting off a surface on which the aerial vehicle is supported, hovering while remaining stationary relative to the surface, changing altitude, traveling at speed in a given direction, turning, changing pitch, changing roll, and changing yaw.

Any one of the example methods above, further including increasing the first portion of the mechanical power supplied to the first propulsion member during at least one of lifting-off of the surface on which the aerial vehicle is supported, increasing altitude of the aerial vehicle, or level flight in a given direction.

Any one of the example methods above, further including decreasing the first portion of the mechanical power supplied to the first propulsion member during descending of the aerial vehicle.

Any one of the example methods above, further including increasing the second portion of the mechanical power supplied to the electric power generation device during at least one of turning the aerial vehicle and increasing altitude of the aerial vehicle.

Any one of the example methods above, further including decreasing the second portion of the mechanical power supplied to the electric power generation device during at least one of descending of the aerial vehicle or hovering.

Any one of the example methods above, wherein receiving the at least one signal includes receiving at least one signal indicative of at least one status factor associated with the aerial vehicle, wherein the at least one status factor includes at least one of: an amount of fuel carried by the aerial vehicle, a weight of the aerial vehicle, payload carried by the aerial vehicle, weight distribution of the aerial vehicle, a level of charge of an electric power storage device carried by the aerial vehicle, a temperature associated with the mechanical power source, an altitude of the aerial vehicle, or efficiency of operation of the aerial vehicle.

Any one of the example methods above, further including storing at least a portion of the electrical power via an electric power storage device.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. A powertrain for an aerial vehicle, the powertrain comprising:
a mechanical power source configured to supply mechanical power;

an electric power generation device mechanically coupled to the mechanical power source and configured to convert at least a portion of the mechanical power into electrical power;

an electric motor electrically coupled to the electric power generation device and configured to convert electrical power into rotational power;

a first propulsion member mechanically coupled to the mechanical power source and configured to convert mechanical power supplied by the mechanical power source into a first thrust force;

a second propulsion member mechanically coupled to the electric motor and configured to convert rotational power supplied by the electric motor into a second thrust force; and a vehicle controller in communication with the mechanical power source, the electric power generation device, and the electric motor, the vehicle controller configured to:

at least partially control aerial maneuvering of the aerial vehicle; and cause supply of a first portion of the mechanical power from the mechanical power source to the first propulsion member and a second portion of the mechanical power from the mechanical power source to the electric power generation device based at least in part on at least one characteristic associated with maneuvering of the aerial vehicle, the first propulsion member positioned for directing a cooling airflow onto at least one of the vehicle controller or the electric power storage device when the first propulsion member is operated.

2. The powertrain of claim 1, further comprising an electric power storage device coupled to the electric power generation device and configured to store at least a portion of electrical power generated by the electric power generation device.

3. The powertrain of claim 1, wherein the mechanical power source comprises an internal combustion engine.

4. The powertrain of claim 1, wherein at least one of the first propulsion member or the second propulsion member comprises a first propeller and a second propeller, and wherein the first propeller and the second propeller comprise counter-rotating propellers having common axes of rotation.

5. The powertrain of claim 1, wherein at least one of the first propulsion member or the second propulsion member comprises at least one of a propeller, an open rotor, or a ducted fan.

6. The powertrain of claim 1, further comprising a mechanical coupling that couples the mechanical power source and the first propulsion member to one another, the mechanical coupling configured to facilitate change of the first portion of the mechanical power transferred to the first propulsion member from the mechanical power source.

7. The powertrain of claim 6, wherein one or more of:
the mechanical coupling comprises at least one of a clutch or a transmission; or
the mechanical coupling comprises a transmission, and the transmission comprises at least one of a continuously variable transmission, a planetary gear train, or a belt drive.

8. The powertrain of claim 1, further comprising one or more of:
a transmission between the mechanical power source and the first propulsion member and configured to convert an input speed into an output speed, such that an operation speed of the mechanical power source differs from a rotational speed of the first propulsion member; or
a transmission between the mechanical power source and the electric power generation device and configured to convert an input speed into an output speed, such that an operation speed of the mechanical power source differs from a rotational speed of the electric power generation device.

9. The powertrain of claim 1, further comprising a first drive shaft coupling the mechanical power source to the first propulsion member, and a second drive shaft coupling the mechanical power source to the electric power generation device; and
wherein one or more of:
the first drive shaft extends in a first direction relative to the mechanical power source, and the second drive shaft extends in a second direction relative to the mechanical power source opposite the first direction; or
one of the first drive shaft or the second drive shaft is hollow, and the other of the first drive shaft or the second drive shaft extends at least partially through the one of the first drive shaft or the second drive shaft.

10. The powertrain of claim 1, wherein one or more of:
operation of the first propulsion member is configured to cause at least one of vehicle thrust, vehicle lift, or control of vehicle maneuvering for the aerial vehicle; or
operation of the second propulsion member is configured to cause at least one of vehicle thrust, vehicle lift, or control of vehicle maneuvering for the aerial vehicle.

11. The powertrain of claim 1, wherein at least one of the first propulsion member or the second propulsion member comprises at least one blade configured to change blade pitch.

12. The powertrain of claim 1, wherein the vehicle controller is configured to cause supply of the first portion of the mechanical power to the first propulsion member and the second portion of the mechanical power to the electric power generation device based at least in part on at least one status factor associated with the aerial vehicle, the at least one status factor comprising at least one of: an amount of fuel carried by the aerial vehicle, a weight of the aerial vehicle, a payload carried by the aerial vehicle, weight distribution of the aerial vehicle, a level of charge of an electric power storage device carried by the aerial vehicle, a temperature associated with the mechanical power source, an altitude of the aerial vehicle, or efficiency of operation of the aerial vehicle.

13. An aerial vehicle comprising:
a chassis;
a mechanical power source coupled to the chassis and configured to supply mechanical power;
an electric power generation device coupled to the chassis and the mechanical power source and configured to convert at least a portion of the mechanical power into electrical power;
an electric motor coupled to the chassis and the electric power generation device and configured to convert electrical power into rotational power;
a first propulsion member coupled to the chassis and the mechanical power source and configured to convert at least a portion of the mechanical power supplied by the mechanical power source into a first thrust force;

a second propulsion member coupled to the chassis and the electric motor and configured to convert the rotational power supplied by the electric motor into a second thrust force; and a vehicle controller in communication with the mechanical power source, the electric power generation device, and the electric motor, the vehicle controller configured to:

at least partially control aerial maneuvering of the aerial vehicle; and cause supply of a first portion of the mechanical power from the mechanical power source to the first propulsion member and a second portion of the mechanical power from the mechanical power source to the electric power generation device based at least in part on at least one characteristic associated with maneuvering of the aerial vehicle, the first propulsion member positioned for directing a cooling airflow onto at least one of the vehicle controller or the electric power storage device when the first propulsion member is operated.

14. The aerial vehicle of claim 13, wherein the aerial vehicle is configured to be at least one of at least partially remotely controlled, semi-autonomously controlled, or autonomously controlled.

15. The aerial vehicle of claim 13, further comprising at least one sensor configured to generate at least one signal indicative of at least one of a location of the aerial vehicle, motion of the aerial vehicle, orientation of the aerial vehicle, at least one object in an environment surrounding the aerial vehicle, a weight of the aerial vehicle, a weight distribution of the aerial vehicle, a weight of a payload carried by the aerial vehicle, or an amount of fuel carried by the aerial vehicle.

16. The aerial vehicle of claim 15, wherein one or more of:

the vehicle controller is configured to receive the at least one signal and cause supply of the first portion of the mechanical power to the first propulsion member and the second portion of the mechanical power to the electric power generation device based at least in part on the at least one signal;

the vehicle controller is configured to receive the at least one signal and at least partially control aerial maneuvering of the aerial vehicle based at least in part on the at least one signal; or the vehicle controller comprises a navigation controller configured to receive the at least one signal, and cause the aerial vehicle to maneuver to a destination based at least in part on the at least one signal.

* * * * *